(12) United States Patent
Kothuri et al.

(10) Patent No.: US 7,080,065 B1
(45) Date of Patent: Jul. 18, 2006

(54) QUERY PRUNING USING INTERIOR RECTANGLES IN AN R-TREE INDEX

(75) Inventors: Ravi Kanth V. Kothuri, Nashua, NH (US); Siva Ravada, Nashua, NH (US); Daniel Geringer, Potomac, MD (US)

(73) Assignee: Oracle International Corporation, Redwood Shores, CA (US)

( * ) Notice: Subject to any disclaimer, the term of this patent is extended or adjusted under 35 U.S.C. 154(b) by 173 days.

(21) Appl. No.: 09/886,487

(22) Filed: Jun. 22, 2001

(51) Int. Cl.
*G06F 17/00* (2006.01)
*G06F 17/30* (2006.01)

(52) U.S. Cl. ........................................ 707/3; 707/104.1
(58) Field of Classification Search ................ 707/100, 707/1–6, 104.1; 345/441
See application file for complete search history.

(56) References Cited

U.S. PATENT DOCUMENTS

| | | | |
|---|---|---|---|
| 5,428,744 A | * 6/1995 | Webb et al. | 345/561 |
| 5,710,916 A | 1/1998 | Barbara et al. | |
| 5,963,956 A | * 10/1999 | Smartt | 707/104.1 |
| 5,988,853 A | * 11/1999 | Kim et al. | 700/90 |
| 6,084,595 A | * 7/2000 | Bach et al. | 345/589 |
| 6,115,717 A | * 9/2000 | Mehrotra et al. | 707/102 |
| 6,148,295 A | * 11/2000 | Megiddo et al. | 707/3 |
| 6,154,746 A | * 11/2000 | Berchtold et al. | 707/100 |
| 6,252,605 B1 | * 6/2001 | Beesley et al. | 345/441 |
| 6,263,334 B1 | * 7/2001 | Fayyad et al. | 707/5 |
| 6,308,177 B1 | * 10/2001 | Israni et al. | 707/100 |
| 6,438,269 B1 | * 8/2002 | Kim et al. | 382/261 |

OTHER PUBLICATIONS

Kim et al "Development of multi–step filtering processor", IEEE 1999 pp. 169–176.*
Silva et al "An exact interactive time visibility ordering algorithm for polyhedral cell complexes", IEEE 1998, pp. 87–94.*

P. Fischer et al., Computing a Maximum Axis–Aligned Rectangle in a Convex Polygon, Information Processing Letters 51 (1994) 189–193.

R. Kothuri et al, Efficient Processing of Large Spatial Queries Using Interior Approximations, Advances in Spacial and Temporal Databases, Lecture Notes in Computer Science, 2121, pp. 404–424, Redondo Beach CA, Jul. 2001.

H. Alt et al., Computing the Largest Inscribed Isothetic Rectangle, pp. 1–8, Proc. 7$^{th}$ Canadian Conference Computational Geometry, Universit's Laval, Qu'ebec, Aug. 1995.

K. Kanth et al., Indexing Medium–Dimensionality Data in Oracle, Proc. of ACM SIGMOND Intl. Conference on Management of Data, pp. 521–522, Jun. 1999.

* cited by examiner

*Primary Examiner*—Uyen Le
(74) *Attorney, Agent, or Firm*—Bingham McCutchen LLP

(57) ABSTRACT

To determine relationships among objects represented in a database at least one interior rectangle lying entirely within a first geometric shape is define. A minimum bounding area for the first geometry and a minimum bounding area for a second geometry are defined and compared with one another to determine if the second geometry fulfills a primary filter condition of an interaction between the first and second geometries. Based on the fulfillment of the primary condition by the second geometry, it is determined whether an intermediate filter condition of interaction between the first and second geometries is fulfilled by analyzing the distribution of the second geometry with respect to at least one interior rectangle within the first geometry. It is determined whether the second geometry fulfills a secondary filter condition by comparing the second geometry with the first geometry if the second geometry fulfills the primary filter condition.

55 Claims, 18 Drawing Sheets

QUERY PRUNING USING INTERIOR RECTANGLES IN AN R-TREE INDEX

FIELD OF THE INVENTION

The present invention relates to a method for determining relationships among one or ore query objects and one or more objects represented in a database.

BACKGROUND OF THE INVENTION

Information in databases may be organized according to any number of techniques. Examples of the many database indexes include the quadtree, the B-tree, and the R-tree. Different database index structures may be more suitable for particular types of data. For example, some database index structures, such as B+trees, may not be suited multi-dimensional data.

The R-tree is an object hierarchy that is applicable to arbitrary spatial objects that is and formed by aggregating minimum bounding boxes for the spatial objects and storing the aggregates in a tree structure. The aggregation is based, in part, on proximity of the objects or bounding boxes. Each node in the tree represents a region in the space. Its children represent (possibly overlapping) subregions. The child regions do not need to cover the entire parent region. While the R-tree is designed primarily for storing region objects, it can be adapted to points by defining points as "degenerate" rectangles where all vertices are identical.

The number of objects or bounding boxes that are aggregated in each node is permnitted to range between $m \leq (M/2)$ and M, thereby leading to use of the prefix (m,M) to characterize a particular R-tree and mirroring the effect of a B-tree. The root node in an R-tree has at least two entries unless it is a leaf node, in which case it has just one entry corresponding to the bounding box of an object. The tree is height-balanced (with maximum height $\log_m r$).

An R-tree can be constructed in either a dynamic or a static manner. Dynamic methods build the R-tree as the objects are encountered, while static methods wait until all the objects have been input before building the tree. The results of the static methods are usually characterized as being packed since knowing all of the data in advance permits each R-tree node to be filled to its capacity.

There are two principal methods of determining how to fill each R-tree node. The most natural method is to take the space occupied by the objects into account when deciding which ones to aggregate. An alternative is to order the objects prior to performing the aggregation. However, in this case, once an order has been established, there is not really a choice as to which objects (or bounding boxes) are being aggregated. One order preserves the order in which the objects were initially encountered. That is, the objects in aggregate i have been encountered before those in aggregate i+1.

According to one method, insertion of a region object R occurs as follows. Starting at root, children that completely contain R are identified. If no child completely contains R, one of the children is chosen and expanded so that it does contain R. If several children contain R, one is chosen and the process proceeds to the next child. The above containment search is repeated with children of the current node. Once a leaf node is reached, R is inserted if there is room. If no room exists in the leaf, it is replaced by two leaves. Existing objects are partitioned between two leaves and parent. If no room exists in the parent, change propagates upward.

One difference between static and dynamic methods is that static methods rebuild the entire R-tree as each new object is added. In contrast, dynamic methods add the new objects to the existing R-tree. Dynamic methods differ in the techniques used to split an overflowing node during insertion.

There are two types of dynamic methods. The first type has the goal of minimizing coverage and overlap. These goals are at times contradictory and thus heuristics are often used. The second type makes use of the ordering applied to the objects (actually their bounding boxes). They are termed nonpacked. In this case, the result is equivalent to a B+-tree and all update As algorithms are B+-tree algorithms. These update algorithms do not make use of the spatial extent of the bounding boxes to determine how to split a node. Thus, the goals of minimizing overlap or coverage are not part of the node splitting process although this does not preclude these methods from having good behavior with respect to these goals.

Static methods differ on the basis of the method used to order the objects. The dynamic methods that are not based on an ordering, that is, reduction of coverage and overlap, range from being quite simple, for example, exhaustive search, to being fairly complicated, for example, R*-tree. Some method just split the overflowing node, while others, that is, the R*-tree, try to reinsert some of the objects and nodes from the overflowing nodes thereby striving for better overall behavior (e.g., reduction in coverage and overlap).

In general, the goal of splitting techniques is to minimize coverage and overlap. These goals are at times contradictory and, thus, heuristics are often used. Below are listed a few node splitting algorithms that range from being quite simple, for example, exhaustive search, to being fairly complicated, for example, R*-tree. Some methods split the overflowing node, while others try to reinsert some of the objects and nodes from the overflowing nodes, thereby striving for better overall behavior, for example, reduction in coverage and overlap.

A number of different node splitting algorithms may be tried, including:
I. Dynamic methods based on minimizing coverage and/or overlap
  1. Exhaustive search
  2. Quadratic method
  3. Linear method
  4. R*-tree
  5. Ang/Tan method
II. Dynamic methods based on an ordering (nonpacked)
  1. Hilbert nonpacked
  2. Morton nonpacked
III. Static methods based on an ordering
  1. Packed
  2. Hilbert packed
  3. Morton packed
  4. VAM split R-tree
  5. Top-down-greedy split (TGS) R-tree Methods I and II are useful for insertion, while method III is typically used for "bulk" creation, that is, creation of indices on a given set of objects.

SUMMARY OF THE INVENTION

An object of the present invention is to provide a method for facilitating the fast processing of queries in a database, thereby reducing cost of the queries and freeing up processor time, among other advantages.

A method for determining relationships among objects represented in a database. According to the method, at least one interior rectangle that lies entirely within the first geometry is defined. A minimum bounding rectangle for the first geometry is defined. A minimum bounding rectangle for a second geometry is defined. The minimum bounding rectangle for the first geometry is compared with the minimum bounding rectangle for the second geometry to determine if the second geometry fulfills a primary filter condition comprising an interaction of the first geometry and the second geometry. If the second geometry fulfills the primary filter condition it is determined whether the second geometry fulfills an intermediate filter condition including an interaction of the first geometry and the second geometry by analyzing the distribution of the second geometry with respect to the at least one interior rectangle within the first geometry. It is determined whether the second geometry fulfills the secondary filter condition by comparing the second geometry with the first geometry if the second geometry fulfills the primary filter condition but is not confirmed as fulfilling the secondary filter condition based upon the distribution of the second geometry with respect to the at least one interior rectangle.

Additionally, the present invention relates to a computer program product for performing a process of determining relationships among objects represented in a database. The computer program product includes a computer readable medium and computer program instructions recorded on the computer readable medium and executable by a processor. The instructions perform steps including defining at least one interior rectangle that lies entirely within the first geometry. A minimum bounding rectangle for the first geometry is defined. A minimum bounding rectangle for a second geometry is defined. The minimum bounding rectangle for the first geometry is compared with the minimum bounding rectangle for the second geometry to determine if the second geometry fulfills a primary filter condition comprising an interaction of the first geometry and the second geometry. If the second geometry fulfills the primary filter condition it is determined whether the second geometry fulfills an intermediate filter condition including an interaction of the first geometry and the second geometry by analyzing the distribution of the second geometry with respect to the at least one interior rectangle within the first geometry. It is determined whether the second geometry fulfills the secondary filter condition by comparing the second geometry with the first geometry if the second geometry fulfills the primary filter condition but is not confirmed as fulfilling the secondary filter condition based upon the distribution of the second geometry with respect to the at least one interior rectangle.

Furthermore, the present invention includes a system for performing a process of determining relationships among objects represented in a database. The system includes a processor operable to execute computer program instructions and a memory operable to store computer program instructions executable by the processor. The instructions stored in the memory perform steps including defining at least one interior rectangle that lies entirely within the first geometry. A minimum bounding rectangle for the first geometry is defined. A minimum bounding rectangle for a second geometry is defined. The minimum bounding rectangle for the first geometry is compared with the minimum bounding rectangle for the second geometry to determine if the second geometry fulfills a primary filter condition comprising an interaction of the first geometry and the second geometry. If the second geometry fulfills the primary filter condition it is determined whether the second geometry fulfills an intermediate filter condition including an interaction of the first geometry and the second geometry by analyzing the distribution of the second geometry with respect to the at least one interior rectangle within the first geometry. It is determined whether the second geometry fulfills the secondary filter condition by comparing the second geometry with the first geometry if the second geometry fulfills the primary filter condition but is not confirmed as fulfilling the secondary filter condition based upon the distribution of the second geometry with respect to the at least one interior rectangle.

Still other objects and advantages of the present invention will become readily apparent by those skilled in the art from a review of the following detailed description. The detailed description shows and describes preferred embodiments of the invention, simply by way of illustration of the best mode contemplated of carrying out the present invention. As will be realized, the invention is capable of other and different embodiments and its several details are capable of modifications in various obvious respects, without departing from the invention. Accordingly, the drawings and description are illustrative in nature and not restrictive.

BRIEF DESCRIPTION OF THE DRAWINGS

Objects and advantages of the present invention will be more clearly understood when considered in conjunction with the accompanying drawings, in which.

DETAILED DESCRIPTION OF THE INVENTION

A spatial or geographic database can include data concerning locations of features in space or on a surface. Spatial data can include geometric data that includes simple primitive elements such as lines, curves, polygons (with and without holes), and compound elements that are made up of a combination of the primitive elements. For example, a geographical database can include data concerning the location of various objects in a region. Along these lines, a geographic database can include mathematical representations of counties, cities, homes, apartment buildings, parks, businesses, subway stations, and other features. The location information could be in the form of latitude and longitude data or other data that defines position.

Once a database including this information is created it is typically desired to access and utilize the information. One way that the information in the databases is utilized involves determining the relative positions of particular location. Along these lines, a person might want to find certain types of businesses in a zip code region. At times, it may be desirable to generally determine whether objects in a database have overlapping locations and, if so, the extent of the overlap.

Analyses such as those described above of data in spatial and/or geographic databases can present a number of problems. To determine relationships among data in a database can overtax memory and computing power, take an unacceptable period of time or cost an unacceptable amount of money. This is especially true with data in geographic databases.

For example, one problem concerning trying to determine whether objects have overlapping locations can involve actually comparing the outlines of the objects to see if any interactions exist. However, carrying out a point-by-point comparison of two geometries typically requires quite a long time, in some cases, on the order of minutes and, in extreme cases, hours.

The present invention provides a solution to problems of analyzing objects in databases. As such, the present invention provides a fast and simple method for determining whether two objects, or geometries, defined by data in a database intersect. Rather than taking minutes or hours to carry out, the present invention can take on the order of seconds or milliseconds. By reducing calculation times, the present invention can free up a processor to perform other calculations or for other uses, such as queries or scalability. The present invention also permits better service to be provided by reducing response times. This helps to ensure that the solution can be utilized with any geographic database, regardless of how large.

Figure 1:
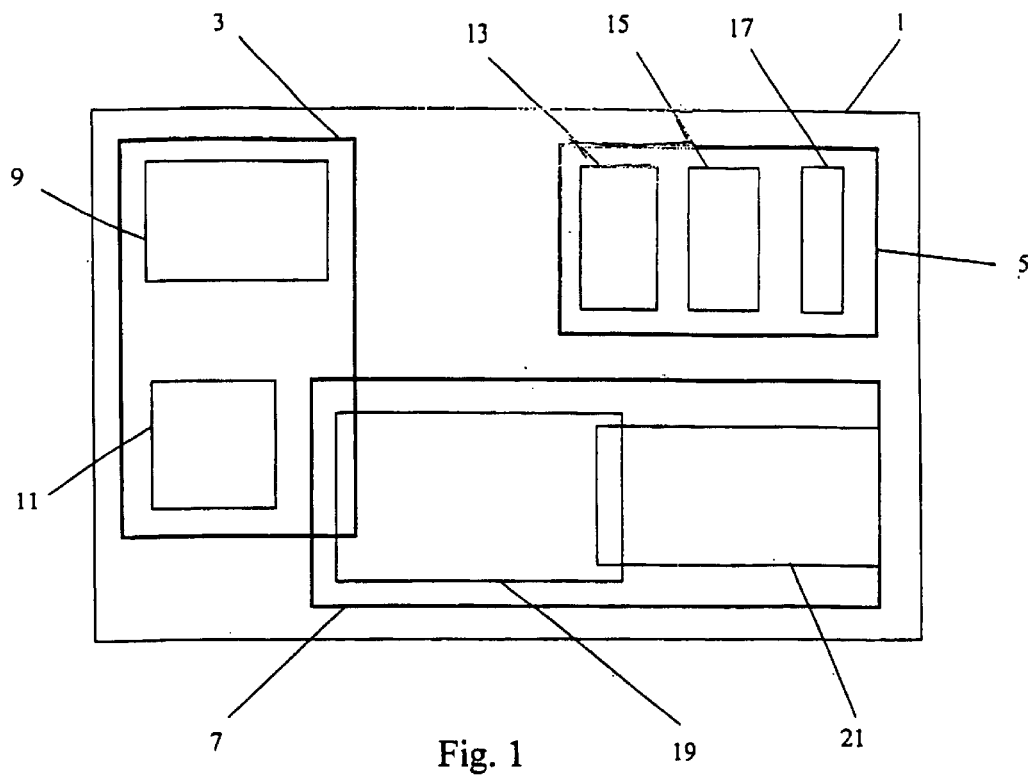
FIG. 1 represents an example of an R-tree node including two levels of children.

FIG. 1 represents a simple R-tree for illustrative purposes. The R-tree shown in FIG. 1 includes a plurality of rectangular objects. An R-tree may be utilized to index databases of objects in the form of points, lines, or rectangles. The objects may be represented by minimum bounding contours. Additionally, the objects may be grouped in groups by minimum bounding contours.

The R-tree node shown in FIG. 1 includes two levels of children. Node 1 shown in FIG. 1 includes minimum bounding contours 3, 5, and 7, representing the first level of children. Each child node 3, 5, and 7, in turn, includes a plurality of child nodes, 9 and 11 in child 3; 13, 15, and 17 in child 5; and 19, and 21 in child 7. Each child node is defined by a minimum-bounding contour. In the example shown in FIG. 1, the minimum bounding contours are all rectangles.

Figure 2:
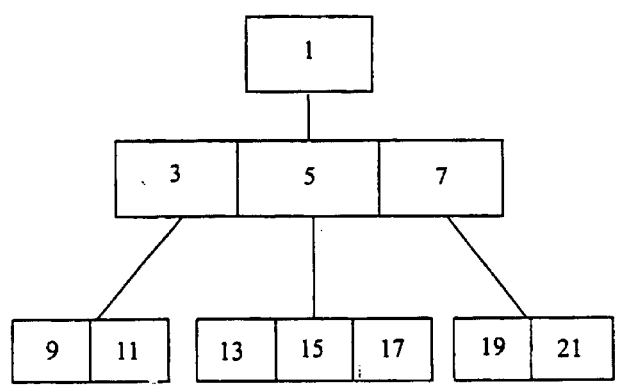
FIG. 2 represents a block diagram of an R-tree index corresponding to the example shown in FIG. 1.

FIG. 2 represents a block diagram showing an R-tree corresponding to the example illustrated in FIG. 1. For objects that are stored in respectively different leaf nodes, the more remote the nearest common ancestor node, the more different the objects are likely to be. That is, strokes or strings stored in leaf nodes having a common parent are likely to be more similar to each other than strokes or strings stored in leaf nodes only having a common grandparent.

The R-tree index may be utilized to support medium-dimensionality data, that is, data having a dimensionality in the range of 3–10. The R-tree index may be implemented utilizing an extensible indexing framework. One example of such a framework is referred to as cooperative indexing in Oracle8i, available from Oracle Corporation. This framework can allow easy creation and maintenance of domain-specific index structures on top of a server layer while reaping the full benefits of operating within a database framework. As a consequence, the R-tree index structure inherits features such as transactional semantics, integrated backup and recovery, security, and replication from the underlying database.

In the specific example of Oracle8i, the R-tree index can index two datatypes. The first datatype includes an sdo_mbr type, which is a d-dimensional rectangle specified by the lower-left and the upper-right corners. The second datatype, is an sdo_geometry type, which is an Oracle8i object type that allows for the specification of complex geometries (as defined by OGC).

Data items may be stored in a relational table, which may be referred to as the base table. The R-tree constructed for the data items may be stored in the database using a metadata table storing the information about the root of the R-tree, its dimensionality and fanout, and the name of the index table storing the nodes of the R-tree.

The R-tree index type can support three types of operations: window queries, nearest-neighbor queries, and intersection joins. Window queries specify a query window and retrieve data whose MBRs interact with the query window in one of 4 ways: intersection, containment, enclosure and exact-match. Nearest-neighbor queries specify a query point and retrieve the k closest data MBRs. Joins identify the data items of two different datasets that intersect with each other. Note that these queries are processed using the MBRs. For some applications such as GIS data where the bounding rectangles only represent first-level approximations of the data items, the query result may have to be post-processed using the complete extents of the data items to obtain the final result. In addition to indexing inherently multi-dimensional columns, R-trees can also be used to index multiple columns so as to answer queries on multiple columns efficiently.

A number of relationships can exist between and among objects represented in the R-tree. The objects may overlap to some extent, an object may lie entirely in another object or vice versa, the borders of objects may intersect, or the objects may be disjoint and have no overlap at all. Typically, a "query" geometry is provided and it is desired to identify geometries in the database, or "data geometries", that do or do not interact in some manner with the query geometry. Some times, it may be desirable to determine objects interacting in specific ways, such as all objects entirely within a query geometry. At other times, it may be desirable to identify any objects that "interact" with a particular query geometry. While objects may be compared by performing an exact comparison of the geometries that define the objects, such a comparison can take a long time and be very costly. For example, if a processor is tied up performing a comparison of geometries, then the processor is unavailable for other functions.

Examples of queries and interactions can include the following:

window queries with different "interaction" criteria
intersection: identify data geometries that intersect the query geometry
inside: identify data geometries that are "completely inside" the query geometry
coveredby: identify data geometries that "touch" on at least one border and are inside the query geometry otherwise
contains: reverse of inside
covers: reverse of coveredby
touch: identify geometries that only "touch" the query geometry but disjoint otherwise
equal: identify geometries that are exactly the same as the query geometry
within-distance (or epsilon) queries: identify geometries that are within a specified distance from the query geometry
nearest-neighbor queries: identify the k nearest neighbors for a query geometry.

Typically, the most frequently used window queries are the ones asking for intersection-type, inside-type, and contains-type of interactions. Within-distance queries can be thought of as intersection-type of window queries where the query geometry is enlarged by the specified distance.

Figure 3:
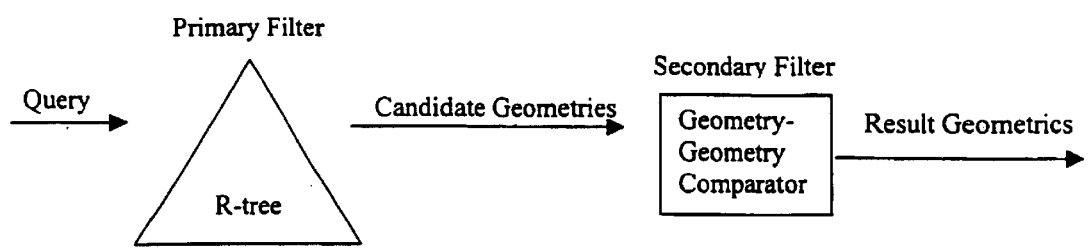
FIG. 3 represents a flowchart that illustrates query processing according to a known method.

Existing solutions to queries such as those described above may utilize a primary filter in a first stage to identify all candidate geometries that could possibly interact with a query geometry, as represented in FIG. 3. In the first stage exterior approximations for data geometries, such as minimum bounding rectangles (MBRs) and convex hulls, or quadtree tiles, which completely enclose the data geometries, may be used. This first stage, usually referred to as the primary filter, typically involves a spatial index. Candidate geometries that may satisfy a given query criterion are identified in the primary filter stage with the help of the exterior approximations in the spatial index.

In a second stage, referred to as a secondary filter, the candidate geometries identified in the first stage are compared with the query geometry and the exact result set is determined and returned to the user. A secondary filter is then employed to perform the exact mathematical comparison of all of the candidate geometries with the query geometry. Even utilizing such filters, the mathematical comparison can be quite expensive. For example, if the query geometry is large, there will be too many candidates that are completely inside the query geometry. As described above, passing each candidate through the secondary filter is quite expensive. On the other hand, if the query is small and many candidates exist that contain the query, then the query can also be quite expensive.

For most spatial datasets, the data geometries typically have hundreds or thousands of vertices and are arbitrarily complex. Secondary filter computation for such geometries takes a long time as opposed to the primary filter. FIG. 2(a) illustrates this by comparing the time taken for primary and secondary filters according to an example utilizing Oracle Spatial available from Oracle Corporation. The data consists of 230K polygons representing the U.S. census blocks. The queries correspond to an approximate geometry that represents a circle of 0.25, 0.5, 1, 2, 5, 10, 25, 50, or 100 mile radius on the surface of earth. Since arcs and circles are not easily representable on the surface of the earth the circle queries are densified to regular convex polygons in geodetic and non-geodetic domains. The center of the query is randomly-generated using locations of business centers across the United States. Such queries, where the query area is larger than those of the spatial features, are quite common in most GIS applications and spatial analysis queries. The x-axis shows the radius in miles from the query center and the y-axis plots the response time for each filter. The figure illustrates that the secondary-filter time is at least twice that of the filter time and dominates the overall computation time. This holds for all radii for the query circle.

The high cost for carrying out the secondary-filter is due to two reasons. First, the loading cost for geometries, or in other words, the cost of the table accesses that fetch candidate geometries. Second, the high cost is attributable to the comparison cost, which is the cost of comparing complex data geometries with the query geometry. For point datasets, the loading cost dominates and for polygon datasets, both costs contribute significantly.

The present invention provides a method that can analyze the geometries and eliminate many geometries from the need to perform the costly and time-consuming mathematical comparison of the geometries. The present invention solves the problem by including an intermediate filter that can eliminate many, if not most, candidates from needing to undergo the expensive secondary filter. The present invention is particularly useful where the query geometry is particularly large or particularly small. Identifying geometries that lie entirely within the interior rectangle can eliminate these geometries from undergoing the costly exact mathematical comparison.

Figure 4A:
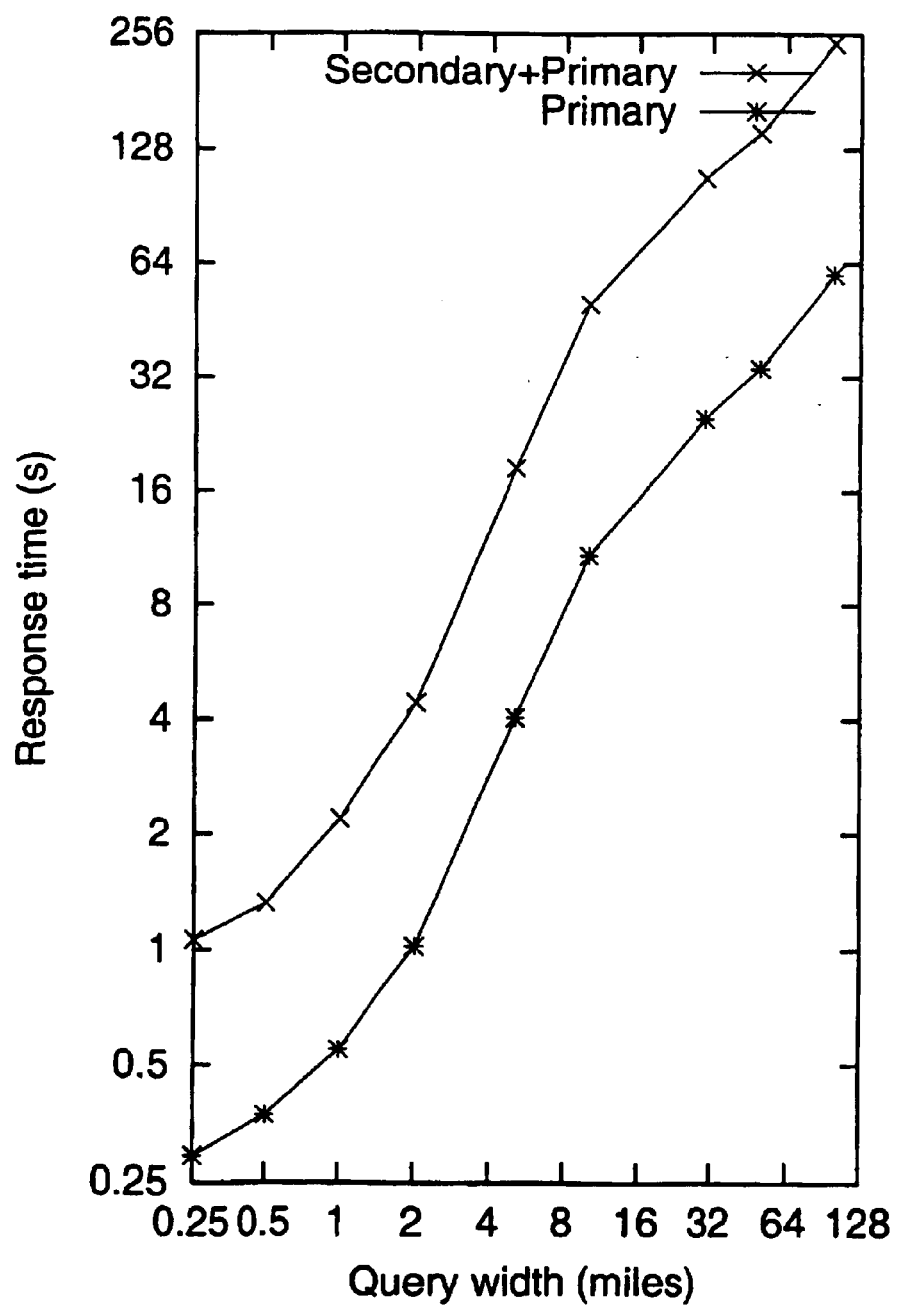
FIG. 4a represents a graph that illustrates a relationship between response time and query width for a query carried out according to a known process including a primary and a secondary filter.
Figure 4B:
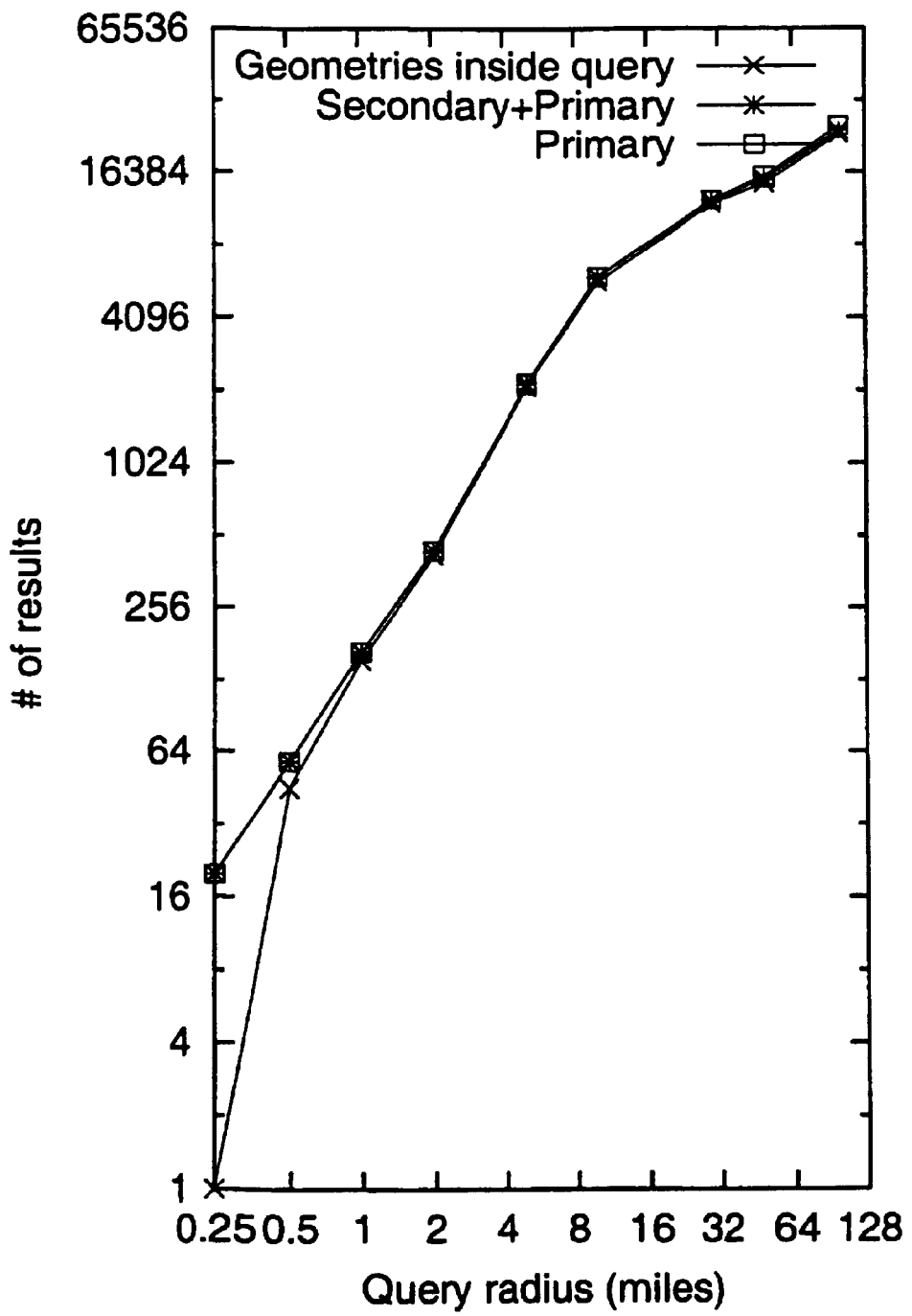
FIG. 4b represents a graph that illustrates a relationship between number of results and query radius for a query carried out according to a known process including a primary and a secondary filter.

FIG. 4(a) illustrates that the number of geometries eliminated in the secondary filter is quite small compared to the total number retrieved. FIG. 4(b) shows that in almost all the cases the difference in primary and secondary filter results is less than about 10%. Additionally, FIG. 4(b) also indicates that as the query radius increases a substantial number of the results are completely inside the query. From this, it could be inferred that whenever the query window is large compared to data sizes, checking for containment in the query may be a useful pruning strategy for bypassing the secondary filter. That is, if a data geometry is completely inside a query geometry, then it could be accepted without passing it to the expensive secondary filter.

According to the present invention, depending upon the relative sizes of the query geometry and the data geometries (the geometries represented in the database), the present invention computes at least one interior rectangle that is completely within either the query geometry or one or more data geometries. Typically, the present invention generates a plurality of interior rectangles. Increasing the number of interior rectangles can increase the amount of the area of a geometry, query or data, that is covered. This can help to eliminate the number of candidates excluded by the intermediate filter and, consequently, reduce the number of candidates subjected to the costly secondary filter. However, at some point, the increased time to generate and search the interior rectangles limits the number of interior rectangles that is IFO desirable. Given the tradeoff between computation and search time for interior rectangles and query candidate elimination gains, experimentation has found that 4 or 5 interior rectangles can maximize query execution time. While the present invention may be discussed primarily with respect to R-trees, it may also be utilized with quadtrees and other arrangements.

According to one embodiment, the present invention does not need to store additional information to be maintained in an index. Rather, the present invention can compute the interior approximations only for query geometries and at the time the query is carried out. This strategy can help to ensure that no structural changes need to be made to the indexes. Since the interior is computed once per query, any additional overhead may be amortized over the number of geometries that are retrieved.

According to another embodiment of the present invention, the interior of both the data geometry and the query geometry are computed and compared. The data interiors may be computed at the time that the index is created. Below are described techniques for assessing only the query interior.

Figure 5:
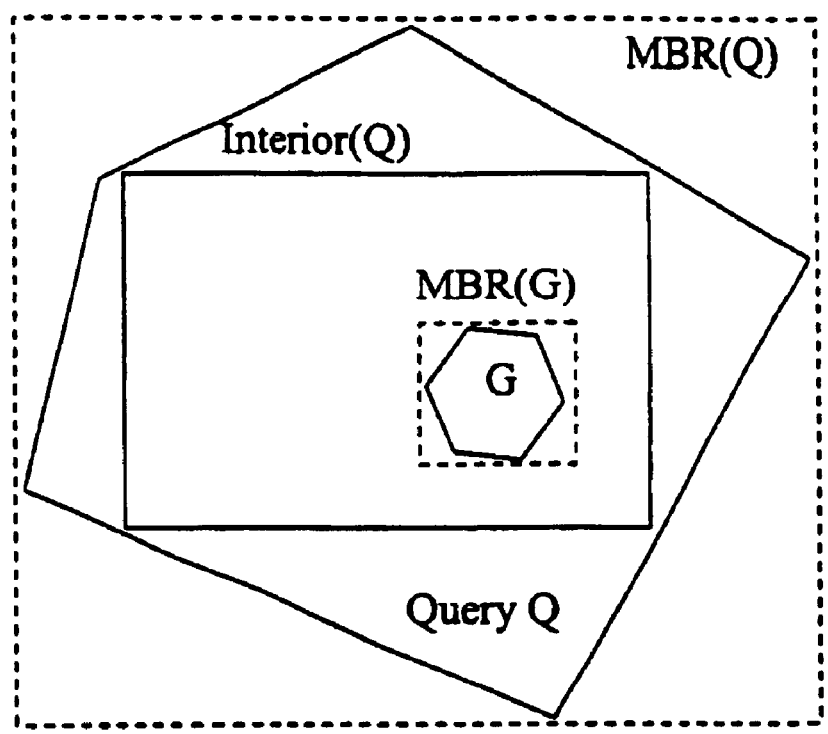
FIG. 5 represents a diagram that illustrates a query geometry, a minimum bounding rectangle for the query geometry, a largest interior rectangle for the query geometry, a data geometry, and a minimum bounding rectangle for the query geometry.
Figure 6:
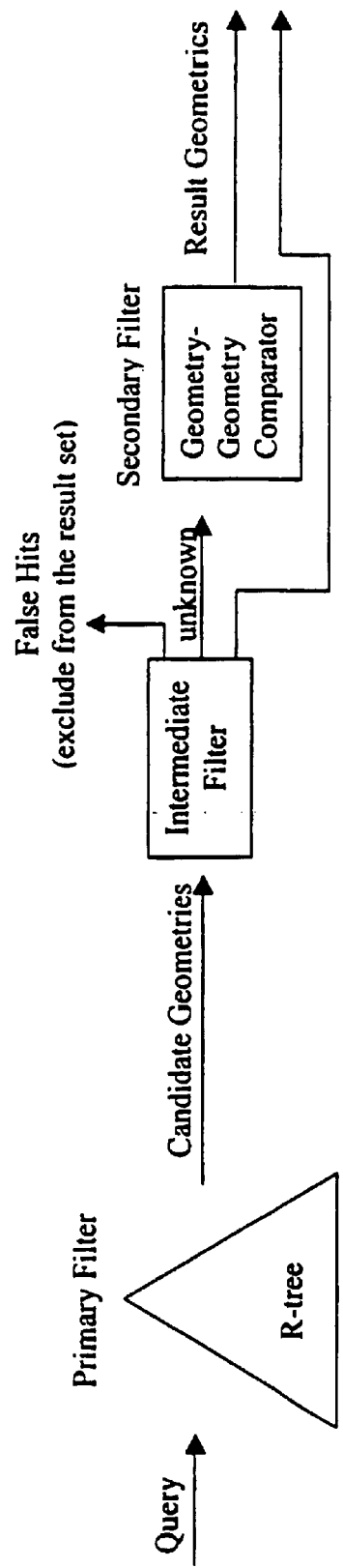
FIG. 6 represents a flowchart that illustrates query processing according to an embodiment of a method according to the present invention.

A simple example includes a query geometry Q and a data geometry G shown in FIG. 5. If it is assumed the query is finding all geometries that intersect the query geometry (window query with intersection-type of interaction). The exterior approximations, which may be MBRs, are shown as dashed boxes and the interior rectangles are shown as solid boxes for the geometries. The primary filter determines that query Q may interact with geometry G using their exterior approximations, the MBRs, which happen to intersect each other. Since the exterior of By the geometry G is inside the interior of the query Q, it follows that the geometry satisfies the intersection criterion of the query. This eliminates the need for the expensive loading and comparison of the geometry and query in the secondary filter. As illustrated in this example, intermediate filtering using interior approximations could enable some query-satisfying geometries to bypass the secondary filter. The two-stage filtering process represented in FIG. 3 may be augmented using such an intermediate filter as represented in FIG. 6.

The R-tree index uses the MBRs of query and candidate data geometries to determine whether or not they interact. If they do interact, then the query and the geometry are passed on to the intermediate filter. The intermediate filter takes the query q, and a candidate geometry g and returns "true" if the geometry is to be included in the result set, "false" if not, and "unknown" if it cannot determine the relationship. If the relationship cannot be determined, the query-candidate pair is passed to the secondary-filter to determine the exact relationship. These paths from the intermediate filter are shown with unknown, true, and false labels in FIG. 6.

The following describes the operational behavior of the intermediate filter for different queries. In this discussion, I(g) denotes the interior approximations for a geometry g, and E(g) denotes the exterior approximation, in this discussion, the MBR, for the geometry g.

The following represent a few examples of addressing different types of window queries.

Intersection (g intersects q), inside (g inside q):

If (I(q) contains E(g)) then return "true"

Otherwise return "unknown"

Here, the interior approximation of the query is used to eliminate unnecessary comparisons in secondary filter as in the example of FIG. 5. If the above test produces a "true" result, then the geometry is directly included in the result set bypassing the comparisons in secondary filter. These are one of the most frequently used queries in practice. As such, this optimization impacts a large gamut of user queries.

Contains (q inside g):

If (E(q) is not inside E(g)) then return "false"

Otherwise, return "unknown" (i.e., process using secondary filter)

Instead of passing directly to the secondary filter, the interior of the geometry, if exists, could be checked against the exterior of the query. However, in this case the primary filter would already test for the MBR of query being inside the MBR of the candidate geometry before invoking any such comparison. In most spatial applications, the number of such geometries satisfying the primary-filter test would be quite few given the small sizes of data geometries compared to the sizes of the query geometries. The improvements would be limited in this case.

Other types of interaction (covers, coveredby, touch, . . . ):

If (I(q) contains E(g)) then return "false"

Otherwise, return "unknown"

Here, the interior approximation of the query is used to eliminate "false hits" that may otherwise propagate to the secondary filter.

Within-distance query can be implemented as a window query (query window enlarged by the specified distance) checking for intersection with data geometries.

In addition to regular window queries, nearest-neighbor algorithms too can benefit from the use of interior approximations. Nearest-neighbor algorithms could use the interior of the query to obtain a more precise estimation of the distances between query and a candidate geometry MBR and use these distances in query pruning and reducing actual-distance calculations. This process is briefly discussed below.

Nearest neighbor queries retrieve a specified number, in this example k, of the data geometries that are closest to a query geometry. Nearest neighbor queries are evaluated by progressively refining the search area from a sphere of infinite radius to a sphere of distance-to-kth-neighbor radius. In this context, the actual minimum distance d(q, g) between a query geometry q and a candidate geometry g satisfies the following relation:

$$d(mbr(q), mbr(g)) \leq d(q, g) \geq d(I(q), I(g)) \geq D(I(q), E(g))$$

Here d(a, b) denotes the minimum distance between objects a and b and d(I(q), I(g)) denotes the minimum of the minimum distances between every pair of rectangles $q_i$ and $g_i$, where $q_i \in I(q)$ and $g_i \in I(g)$. The distance D(I(q), E(g)) denotes the minimum of the maximum distance from any point in the interior of I(q) to E(g). This distance serves as an upper bound on the distance from query to data geometry.

The minimum distance between the MBRs, d(mbr(q), mbr(g)), could be used to prune away all geometries farther than the current k-nearest-neighbor radius. If a geometry falls within the current k-nn radius, then current systems pass it to the secondary filter to determine the actual distance and to see if it needs to be included in the k-nn result set. Using the interior approximations for the query geometry, a good upper bound on the actual distance could be obtained. This bound can be used to determine whether or not to include the geometry in the result set. The actual distance has to be computed only when the interior-mbr distance is greater than the k-nn search radius, or when it is greater than the distance to the (k–1) neighbor. That is, the geometry is being considered for the $k^{th}$ neighbor spot and for setting the k-nn radius. This strategy may eliminate expensive computation of the "actual distance d(q,g)" from query geometry to a candidate data geometry for candidate geometries that fall inside the k-nn radius.

A number of processes may be utilized to generate interior rectangles. One process is described in Fischer et al., *Computing a maximum axis-aligned rectangle in a convex polygon*, INFORMATION PROCESSING LETTERS, 51, pp. 189–194 (1994), the entire contents of the disclosure of which is hereby incorporated by reference. Simply described, a maximal interior rectangle with 3 points on the polygon boundary, is computed as follows. The polygon boundary is divided into 4 zones: south-west, northwest, north-east and south-east using the extreme vertices in x and y-dimensions as demarcators. In each zone, a binary search is performed on the vertices in that zone to identify the vertex or edge where the interior rectangles pivoted at either of its vertices is maximum. An interior rectangle pivoted at a vertex is computed by drawing x-parallel and y-parallel lines to the polygon boundary in other zones. A binary search is performed on the points on the edge to identify the maximum interior rectangle for that zone. This process is repeated for the other zones and the interior rectangle is obtained that has maximum area. Likewise, interior rectangles with 2 vertices on the polygon boundary may be computed. The maximal interior rectangle is obtained by choosing the maximum area rectangle of the two.

According to one embodiment of the invention, to further maximize the interior area captured for a convex polygon, a convex polygon may be divided into several pieces using the x or the y dimension, whichever has the maximum span, and the maximally inscribed rectangle is found for each of these pieces. Four pieces can result in a good trade-off between interior computation time and the area captured. Another embodiment of the present invention addresses concave polygons. Concave polygons may be dealt with the same way as convex polygons. Alternatively, concave polygons may be tiled to determine interactions with other geometries, as described below in greater detail.

As described above, the process of computing interior rectangles can begin with generation of a minimum bounding rectangle. The minimum bounding rectangle is divided into a number similarly sized portions equal to the desired number of interior rectangles. All of the portions have the same size and shape and extend between the same sides of the minimum bounding rectangle. Typically, the portions will extend between the sides of the minimum bounding rectangle that define the longest dimension of the minimum bounding rectangle. For each portion, the almost-maximum-area rectangle that can be totally inscribed in the portion is found. This may be accomplished utilizing a known algorithm that requires $O(n \log^2 n)$ time for an n-point polygon.

Figure 7:
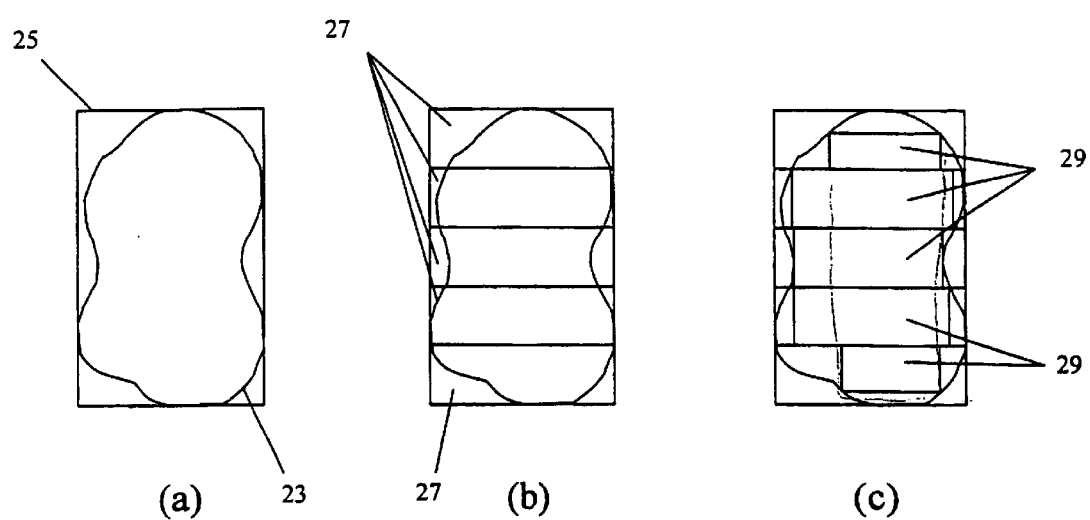
FIGS. 7a, 7b, and 7c represent three different views of definition of partitioning of an object according to an object according to an embodiment of the present invention.

FIGS. 7a, 7b, and 7c illustrate an application of the above-described process. Along these lines, FIG. 7a shows a geometry 23 with a defined minimum-bounding rectangle 25. The minimum bounding rectangle is then divided into 5 equal pieces 27. An almost maximum area rectangle 29 is defined in each portion of the geometry 23 enclosed within each piece 29 of the minimum bounding rectangle.

If the query geometry is large in comparison to the data geometry, then the above-described process is carried out on the query geometry. In this case, in FIGS. 7a–7c, the geometry 23 would be a query geometry. On the other hand, if the query geometry is small as compared to the data geometries, a data geometry would be divided up into rectangles.

The following demonstrates how the effectiveness of interior approximations can be improved in reducing secondary-filter comparisons. Along these lines, if the vertices of a candidate geometry G are inside a convex polygon geometry Q, then the candidate geometry G can be demonstrated to lie inside the convex polygon geometry Q. This is can be evidenced by the fact that since the geometry Q is convex, all points inside are to the right of its edges when traversed in a counter-clockwise order. If the edge (a,b) of geometry G has a segment that is not inside the convex geometry Q, then either a or b are not inside, which is not true, or an edge of Q intersects edge (a,b). This again implies that either vertex a or b is not to the right of an edge of Q. That is, not inside in Q, which is a contradiction. If the vertices of the MBR of a geometry G, whether convex or otherwise, are inside a convex polygon geometry Q, then the geometry G is inside the convex polygon Q. This can permit use of all interior approximations of a convex geometry together in determining if a polygon is inside. This rule, referred to as the "combined-interior-acceptance" rule could be used to accept candidate geometries whenever their geometries are not inside any single interior MBR for a query geometry. That is, the rules discussed above fail. In such a case, it can be determined if the four corners of the MBR of a candidate geometry are inside any of the interior MBRs.

To determine the usefulness of the above-described rule, the following experiment was conducted. The USBG dataset, which includes 230K polygon geometries, was utilized. One hundred random counties from the U.S. counties dataset were selected. The convex hulls of these counties were utilized to query against the U.S. Blockgroup dataset. The average of the results for these queries are shown in Table 2. On average, about 20% of the results were eliminated due to the combined-interior-acceptance rule. The query time improves by more than 35%, although only about 20% of additional geometries were eliminated. This is because the geometries that are eliminated are larger in comparison to other geometries and their elimination from secondary filter comparison improved the performance drastically.

TABLE 2

|  | Combined-Interior-Acceptance | Interior |
| --- | --- | --- |
| response time | 3.06 s | 4.21 s |
| # of secondary filter comparisons eliminated | 475 | 380 |

After defining the interior rectangles for a query or data geometry, a minimum bounding rectangle may be defined for the other of the query or data geometry. The minimum bounding rectangle is compared to the interior rectangles to determine whether a primary filter condition is fulfilled with respect to the interaction of the rectangles. Any one or more of a variety of filter conditions may be utilized as the primary filter condition. For example, the primary filter condition may include any interaction between a first geometry and a second geometry.

The first geometry and the second geometry may be a query geometry and a data geometry. Alternatively, both the first and the second geometry may be data geometries. Additionally, the first geometry and the second geometry may be represent geometries having any number of dimensions, whether points, lines, planes, and/or three-dimensional shapes. Depending upon the database, the first geometry and the second geometry may be exact geometries and/or approximations of geometries.

In some cases, the primary filter may employ interior and/or bounding shapes. Along these lines, the primary filter condition may include one or more interactions between the interior and bounding shapes and/or one or more interactions between an interior or bounding shape and one of the geometries involved in a query.

Regardless of whether geometries and/or generated interior or bounding shapes are involved, the primary filter and/or the secondary condition could include any intersection. Along these lines, the filter conditions could include intersection between the boundary of a geometry and/or an interior or bounding shape, a geometry or bounding shape lying entirely within another geometry or bounding or interior shape, a geometry or bounding or interior shape intersecting a geometry or bounding or interior shape, and/or geometries or bounding or interior shape being disjoint from other geometries or bounding or interior shapes.

According to one embodiment, the primary filter condition will be satisfied if any interaction is found between a minimum bounding shape, which may be a rectangle as described above, and an interior shape, which may also be a rectangle as described above. Once all geometries are identified that fulfill the primary filter condition, these geometries are subjected to an intermediate filter condition. The intermediate filter condition functions to eliminate as many geometries as possible from undergoing the costly and time consuming secondary filter, which can include an exact mathematical comparison of the geometries. The intermediate filter condition can include a minimum bounding rectangle of a second geometry lying entirely within an interior rectangle of the first geometry. If a minimum bounding rectangle of a second geometry lies entirely within an interior rectangle of a first geometry, then the entire second geometry must lie entirely within the first geometry.

After applying the intermediate filter to candidates identified by the primary filter, the candidates that do not fulfill the intermediate filter condition may be subject to the secondary filter condition.

Of course, the analysis of the shapes and geometries depends upon the nature of the query. If is desired to determine second geometries lying within a first geometry, then the above intermediate filter could be used. However, if it is desired that the query identify another interaction, then the nature of the filter conditions could change. Again, the filter conditions may include any one or more of touching, intersecting, overlapping, containing, and/or disjointedness. One of ordinary skill in the art, without undue experimentation, once aware of the present invention, could determine suitable filter conditions to utilize to help eliminate candidates from the expensive and time consuming exact comparison.

The technique described above for computing the interior approximation could be extended to concave polygons. To extend the technique, the concave query window may be divided into convex pieces at concave vertices and interior rectangles computed for each of them. One drawback of this approach is that the number of concave vertices for most practical concave query windows is quite large, on the order of hundreds. This might result in a large number of interior rectangles, thereby requiring a lot of memory and possibly a spatial-searching mechanism for quick comparison with candidate MBRs. Another drawback is that since the interiors of different pieces of the concave polygon need not be contiguous any more, the combined-acceptance-rule could not be applied. This means the query interior is treated as fragmented and it is not possible to directly accept a data MBR that spans multiple pieces but is still completely inside the combined interiors. To avoid these drawbacks, an alternate technique may be utilized for finding the interior approximations for concave query windows. According to this technique, the concave geometry is tiled and tiles are identified that are interior to it. Candidate MBRs are also tiled and the tiles for the candidate MBR are searched among the interior tiles for the concave query window.

Figure 8:
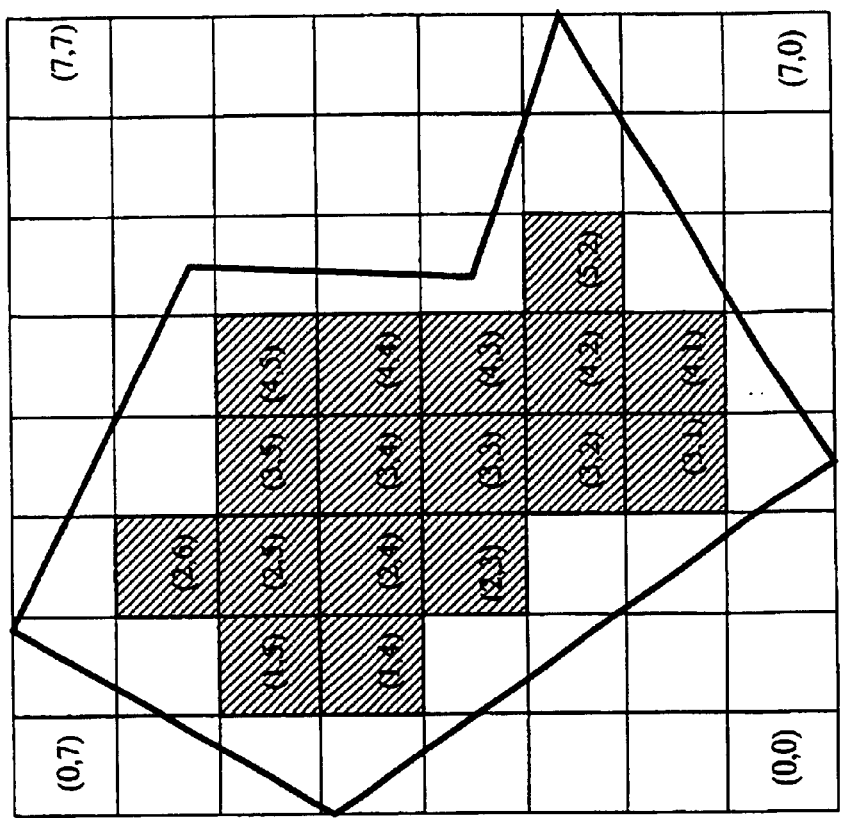
FIG. 8 represents a diagram that illustrates aspects of an embodiment of a process of computing the interior of a concave query using the simple concave query polygon.

FIG. 8 illustrates the process of computing the interior of a concave query using the simple concave query polygon. The query polygon is shown in thick lines. According to this technique, the MBR of the concave query is computed. Using the MBR as the tiling domain, the concave geometry is tiled as in the case of a quadtree. Therefore, if level-1 tiling is chosen, then the MBR is divided into 4 quadrants, if level-2 tiling is chosen each level-1 quadrant is subdivided into 4 sub-quadrants and so on. Each tile is identified by (xcode, ycode), where xcode and ycode refer to the tile coordinates along the x- and y-axes, respectively. In FIG. 8, the tile at the lower-left corner has (xcode, ycode) values of (0,0) and the tile at the lower-right corner has values of (7, 0). Among the tiles that cover the concave window, the tiles that are interior are identified. In FIG. 8, the interior tiles are shown as shaded boxes. The interior tiles are stored twice, once in an X-ordered array and a second time in a Y-ordered array. The X-ordered array orders the tiles first by the xcode value of the tile and if these match then using the ycode values. The Y-ordered array orders the tiles first using ycode values and then using xcode values for tiles with matching ycodes. For illustration purposes, the X-ordered array (X-array for simplicity) for FIG. 8 has the interior tiles in the following order:

$$\{(1,4), (1,5), (2,3), (2,4), \ldots, (5,2)\}$$

Figure 9:
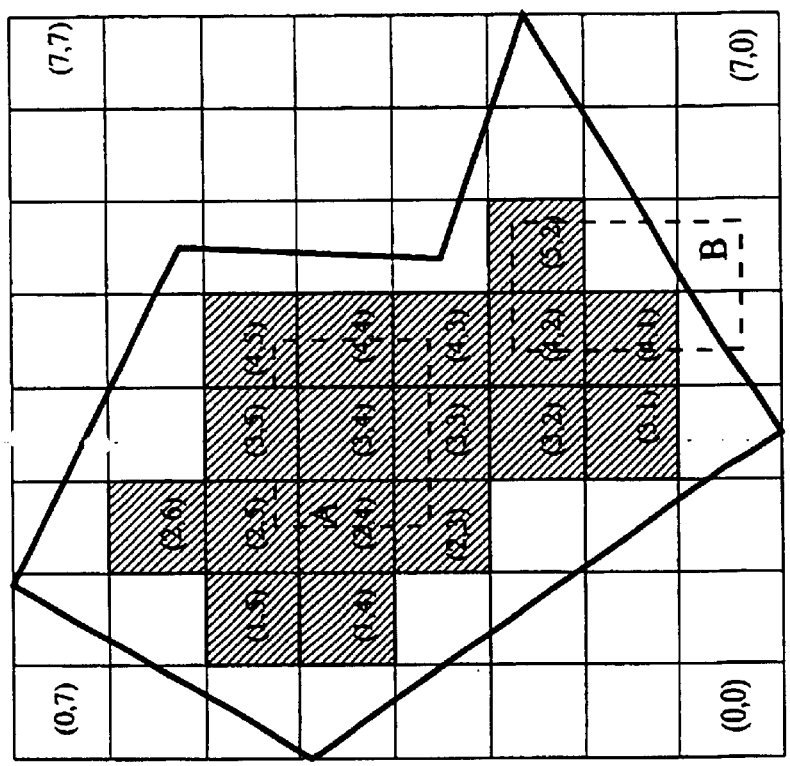
FIG. 9 represents a diagram that illustrates aspects of an embodiment of a process of computing the interior of a concave query using the simple concave query polygon.

The concave interior in intermediate filter may be utilized in queries as follows. Whenever the query MBR intersects the data MBR, the data MBR may be compared with the interior tiles of the concave geometry. If the data MBR is inside or matches the interior, then the data geometry is right away included or excluded, based on the interaction criterion as described above, in the result set bypassing the secondary filter. Otherwise, the data geometry is passed on to the secondary filter. Then, it is determined whether a data MBR is inside the interior of the concave query window. For example, two data MBRs A and B intersect the query MBR shown in FIG. 9. To determine whether a candidate MBR is inside the query interior, we search in the interior tile arrays of the concave query. This search can include identifying the tile corresponding to each corner of the candidate MBR. For this example, the tiles are identified as (x0, y0), (x1, y0), (x1, y1), and (x0, y1). The data MBR A has corners in the tiles (2,3), (4,3), (4,5) and (2,5). Similarly, the data MBR B has corners at (4,0), (5,0), (5,2) and (4,2). Next, it is determined if all of the 4 tile borders of the data MBR corresponding to the 4 sides of the MBR are inside the interior of the query. If they are, then the data MBR is inside the query window. For example in FIG. 9, for MBR A, all the tile borders are inside the interior tiles of the query. On the other hand, for MBR B, only one is inside and the other 3 span non-interior tiles.

Each border of the MBR may be searched in the tile array as follows. If the border is parallel to the x-axis, that is, y-code values are same for both endpoints, then search in the Y-ordered tile array, otherwise search in the X-ordered tile array. The border, that is, the interval in tile domain, may be utilized to perform a range search in the appropriate interior (X-ordered or Y-ordered) tile array. If the number of tiles retrieved is equal to the length, that is, the difference in x-codes, of the border, then the border may be considered to be inside, otherwise not. For example, the border joining tiles (2,3) and (4,3) is inside the query interior since all tiles between (2,3) and (4,3) are also interior. On the other hand, the border joining tiles (4,0) and (5,0) of MBR B is not inside as the tile (5,0) is not an interior tile of the query. Each such border search involves 2*log n time, where n is the number of interior tiles for the query window. Since binary searches are performed, the above searching typically takes at most 0 log n time if there are at most n tiles. As will be seen in our experiments, this time is quite negligible for most queries.

Checking with the sides is sufficient and correct as long as the second geometry does not have any holes or is not a compound polygon. Otherwise, for each side, for compound polygons and polygons with holes (not in the paper), the following procedure, which takes O(min(xlength, ylength) *log t) is used:
where xlength is the length of a side parallel to x-axis and y-length is the length of a side parallel to y-axis.

If the 4 corners of the MBR are (x1, y1), (x1, y2), (x2, y2) and (x2, y1), for a side-parallel to the x-axis and having vertices (x1, y1), (x2, y1)), the search is done as follows: for each t between x1 and x2, which takes O(x2−x1) iterations, search the number of tiles in the X-ordered array using the border (t,y1) and (t,y 2). If this number is not equal to (y2−y1+1), then there are some non-interior tiles and so return "not-interior" right away. This takes O(log t) time for t tiles. Otherwise, if for all values of t between x1 and x2, all the tiles are interior, then it is returned that the MBR is interior to the query geometry (the one that is tiled).

The above process is performed if the xlength=x2−x1 is smaller than ylength=y2−y1. Otherwise, a similar process is performed using a border parallel to the x-axis, keeping y-coordinate constant for the border.

Figure 10:
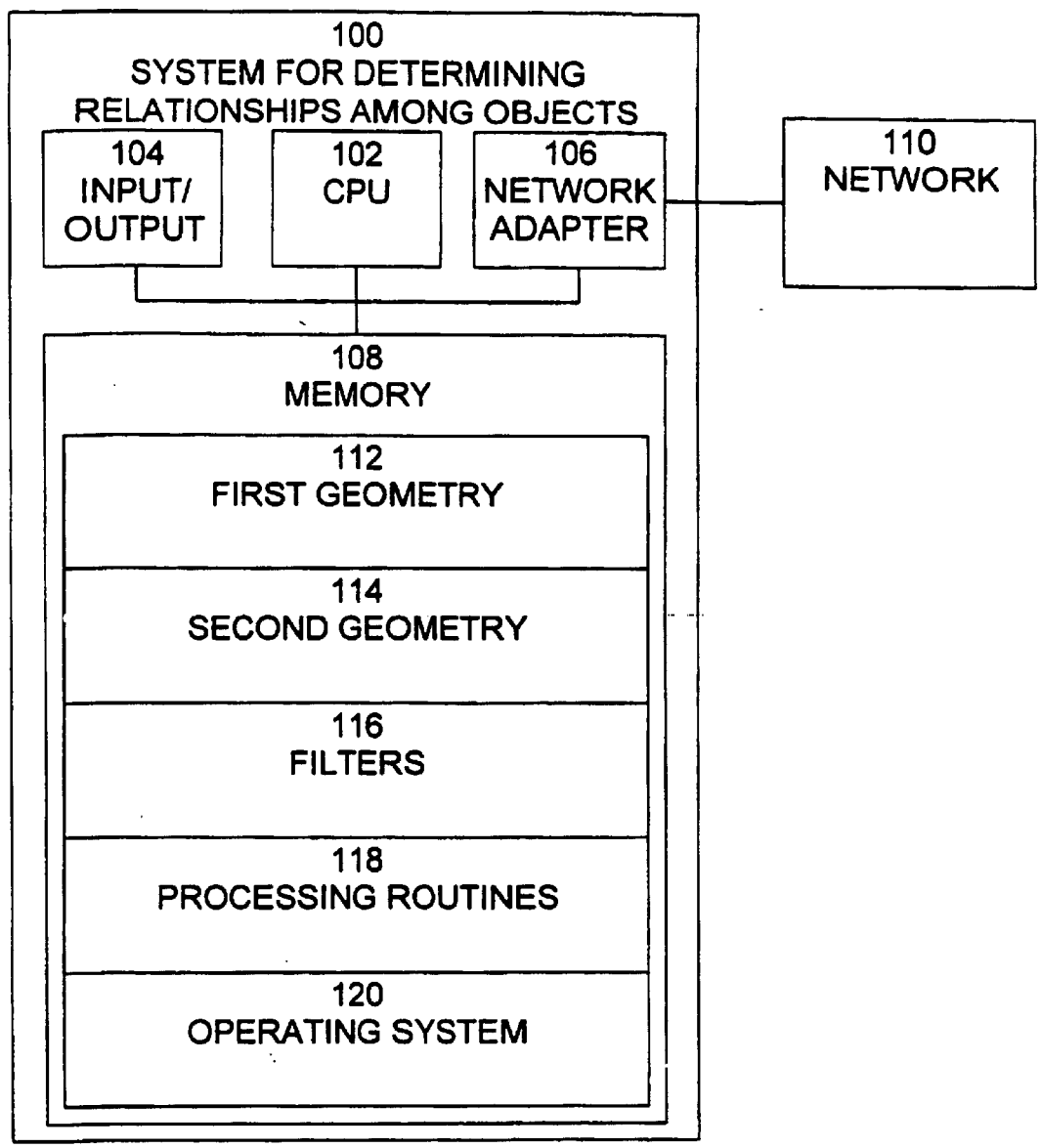
FIG. 10 represents a block diagram illustrating an embodiment of a system according to the present invention for determining relationships among objects represented in a database.

The present invention also relates to a system and a computer program product. FIG. 10 illustrates an exemplary block diagram of a system for determining relationships among objects 100 according to the present invention. Relationship determining system 100 is typically a programmed general-purpose computer system, such as a personal computer, workstation, server system, and minicomputer or mainframe computer. Relationship determining system 100 includes processor (CPU) 102, input/output circuitry 104, network adapter 106, and memory 108. CPU 102 executes program instructions in order to carry out the functions of the present invention. Typically, CPU 102 is a microprocessor, such as an INTEL PENTIUM® processor, but may also be a minicomputer or mainframe computer processor. Input/output circuitry 104 provides the capability to input data to, or output data from, computer system 100. For example, input/output circuitry may include input devices, such as keyboards, mice, touchpads, trackballs, scanners, etc., output devices, such as video adapters, monitors, printers, etc., and input/output devices, such as, modems, etc. Network adapter 106 interfaces relationship determining system 100 with network 110. Network 110 may be any standard local area network (LAN) or wide area network (WAN), such as Ethernet, Token Ring, the Internet, or a private or proprietary LAN/WAN.

Memory 108 stores program instructions that are executed by, and data that are used and processed by, CPU 102 to perform the functions of the present invention. Memory 108 may include electronic memory devices, such as random-access memory (RAM), read-only memory (ROM), programmable read-only memory (PROM), electrically erasable programmable read-only memory (EEPROM), flash memory, etc., and electromechanical memory, such as magnetic disk drives, tape drives, optical disk drives, etc., which may use an integrated drive electronics (IDE) interface, or a variation or enhancement thereof, such as enhanced IDE (EIDE) or ultra direct memory access (UDMA), or a small computer system interface (SCSI) based interface, or a variation or enhancement thereof, such as fast-SCSI, wide-SCSI, fast and wide-SCSI, etc., or a fiber channel-arbitrated loop (FC-AL) interface.

Memory 108 includes a plurality of blocks of data, such as first geometry block 112, second geometry block 114, filter block 116, and a plurality of blocks of program instructions, such as processing routines 118 and operating system 120. First geometry block 112 can store first geometry(ies) and related bounding and/or interior shapes, such as rectangles, that have been received by relationship determining system 100. Second geometry block 114 can store one or more second geometries and associated bounding and/or interior shapes that have been received by the relationship determining system 100. Filter block 118 stores the primary, intermediate and secondary filters that may be used to determine relationships among the geometries. Processing routines 118 are software routines that implement the processing performed by the present invention. Operating system 120 provides overall system functionality.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

The following describes experimental results that support the use of interior approximations for query geometries in spatial processing. The experiments utilized two datasets. A first dataset includes the US Blockgroup dataset, which includes about 230,000 arbitrarily-shaped polygon geometries. The second dataset includes the U.S. Business Area dataset, which includes about ten million data points. For each of these datasets, some of the most-densely populated areas were identified and query center points were randomly generated within the area. For instance, for the ABI dataset the New York Manhattan center was utilized as one query center. Using such query centers, a query window of different radii from about 0.25 miles width to about 100 miles width was generated. For each of these datasets, the query response time for each query window, that is, each query radius, was compared with and without an intermediate filter. This intermediate filter computed the interior-rectangle for query geometries, or data geometries in case of a "contains" query, and applies the combined-interior-acceptance rule and other rules described herein whenever applicable. In this experiment, the primary filter was an Oracle version of an R-tree index constructed using a fanout of 35. The experiments were conducted on a Sun Ultra-1 166 MHz machine with 256 MB memory, available from Sun Microsystems. The R-tree and the intermediate and secondary filters were implemented on top of an Oracle server running a version of Release 9.0.1.

Figure 11A:
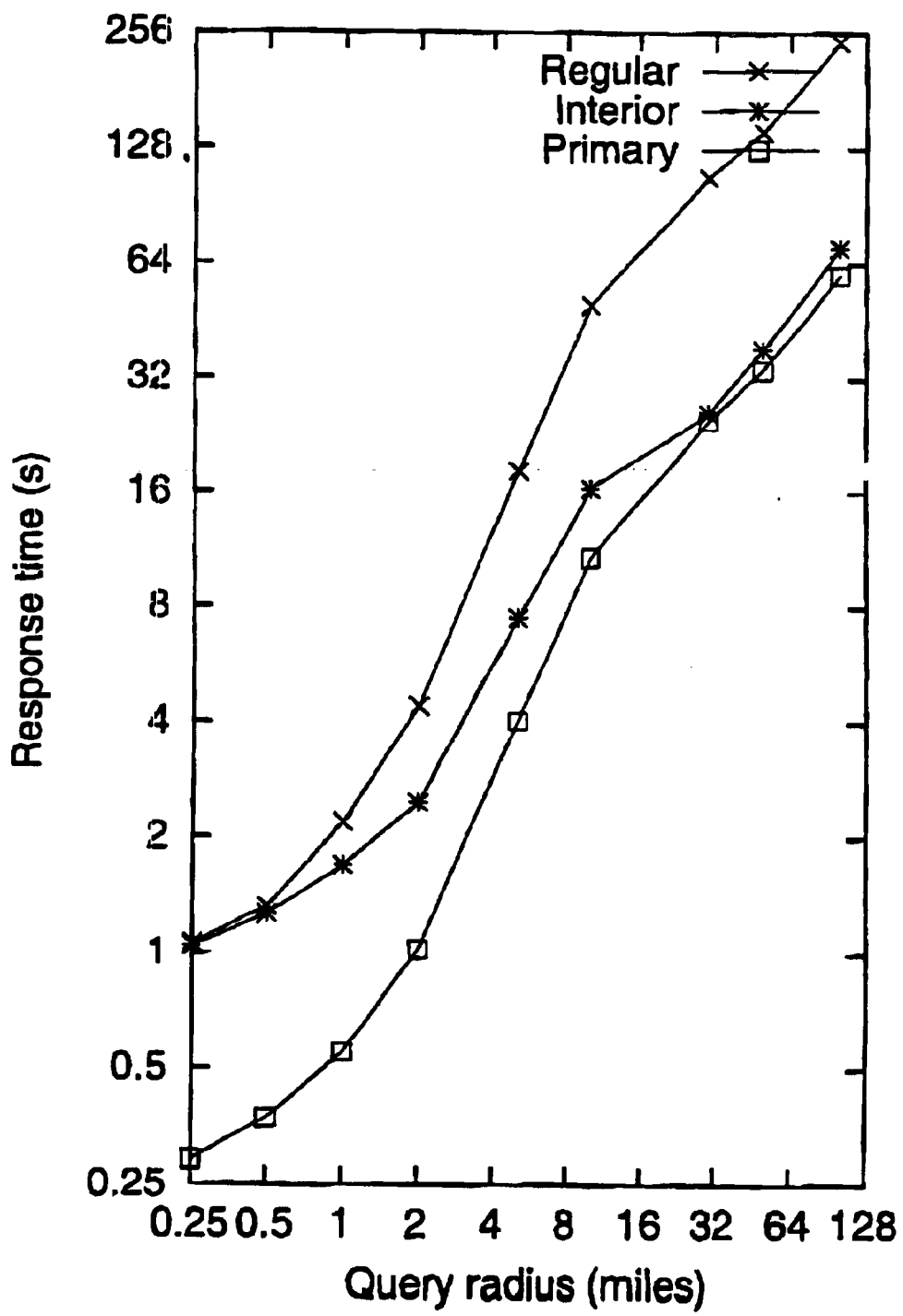
FIGS. 11a, 11b, 12a and 12b represent graphs that illustrate relationships between response time and query radius.
Figure 11B:
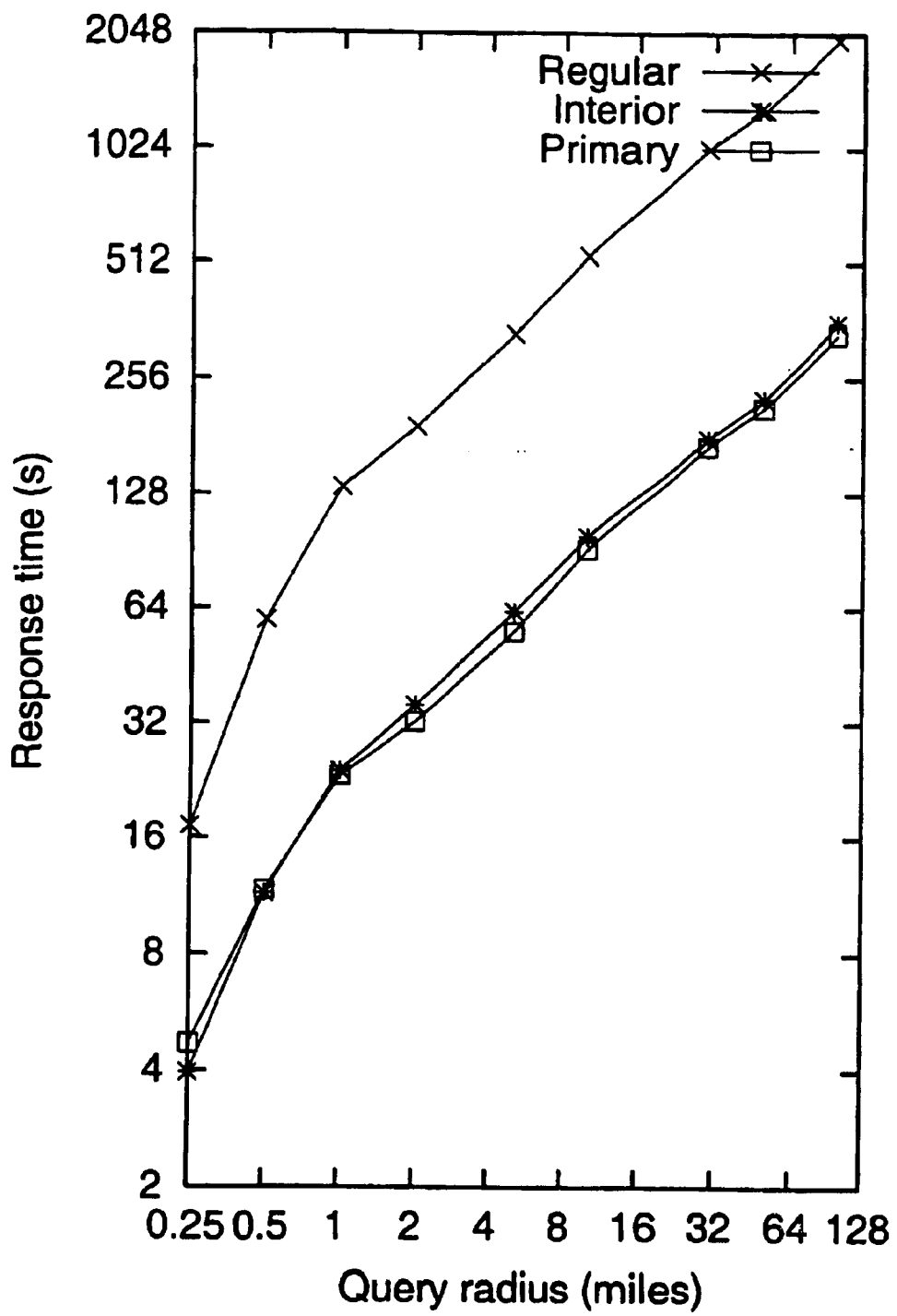

FIGS. 11a and 11b show the results of comparison for the average query time with and without the intermediate filterahat uses interior-rectangles for the query geometries. The queries identify all geometries that intersect the query windows. In the figures, the query window radius in miles is plotted along the x-axis and the query response in milliseconds is plotted along the y-axis. Both scales are logarithmic. FIG. 11(a) shows the results for the USBG dataset. Three time curves are plotted, the time for the primary filter (Primary curve), the time for primary+secondary filter (Regular curve), and the time for primary+intermediate+ secondary filter (Interior curve). The last one reports the total time for a query when processed using interior rectangles. Using interior rectangle approximations improves query response times by around 25% for a query radius of 1 mile and about 50%, or a factor of 2, for a query radius of 2 miles. At a radius of 2 miles, a query on the USBG dataset returned around 350 geometries. The performance gain improves as query windows become larger. For instance, at larger radii of 10–100 miles, the performance improves by nearly 70%, in other words, approximately by a factor of 3. This is because as the query window becomes large, more and more candidate geometries fall inside the query interior and are straight away included in the result set bypassing the secondary-filter. This may be verified by the fact that the Interior curve is quite close to the Primary curve, which implies the time is spent in secondary-filter is less than 10% of the overall query time, which is less than 16% of the original secondary-filter overhead.

Similar performance enhancements are also obtained for the ABI dataset as shown in FIG. 11(b). For the ABI dataset, even the smallest size query shows an improvement unlike the USBG dataset. This is because ABI dataset contains point data and potential candidates can be accepted right away using the interior rectangles for even the smallest-size query. This excludes the need for a secondary-filter comparison where the points or geometries are loaded again from the database table and re-compared with the query. The overall performance matches that of the primary filter as most of the result data fall inside the interior rectangles and are therefore accepted right away.

Figure 12A:
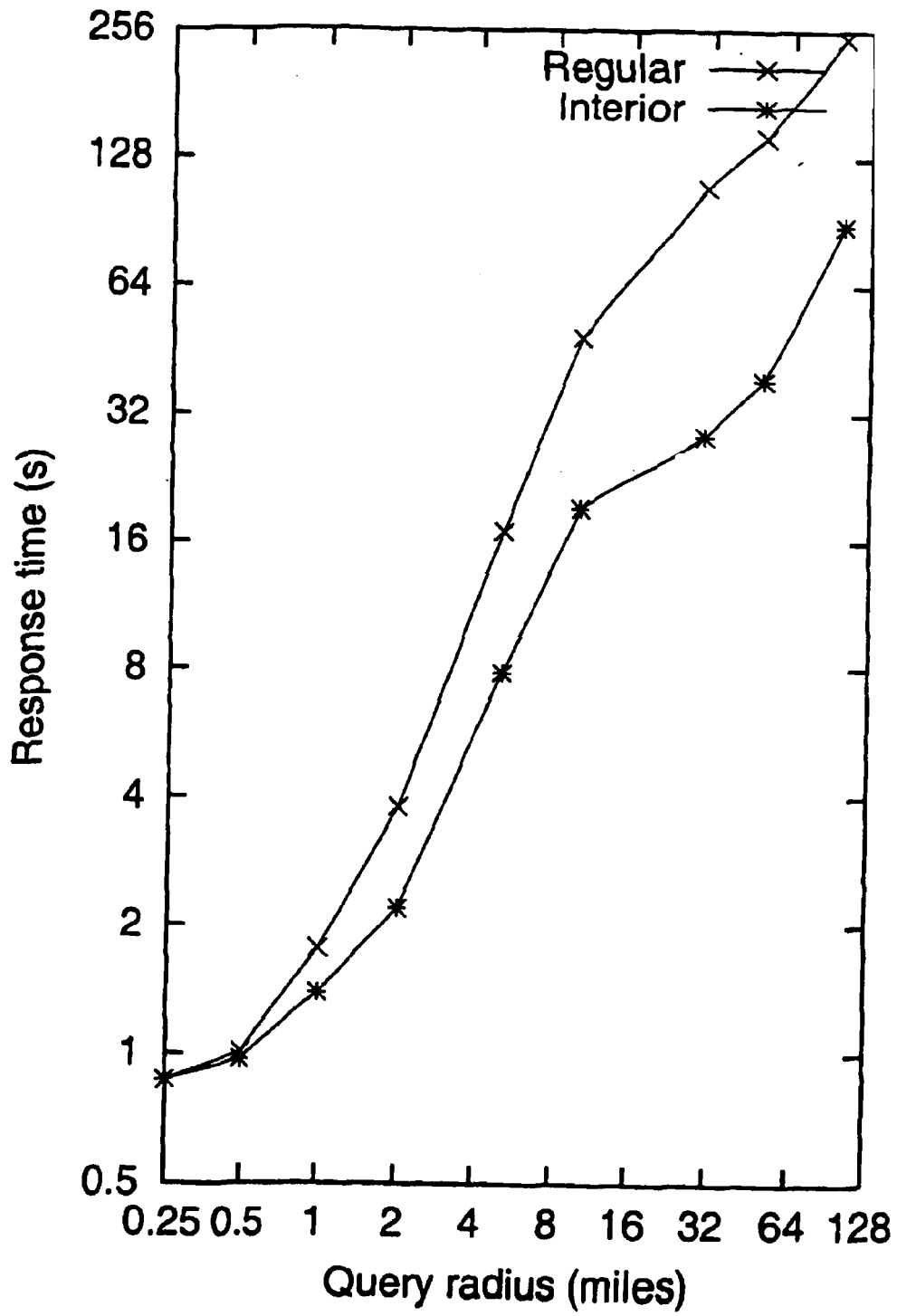
Figure 12B:
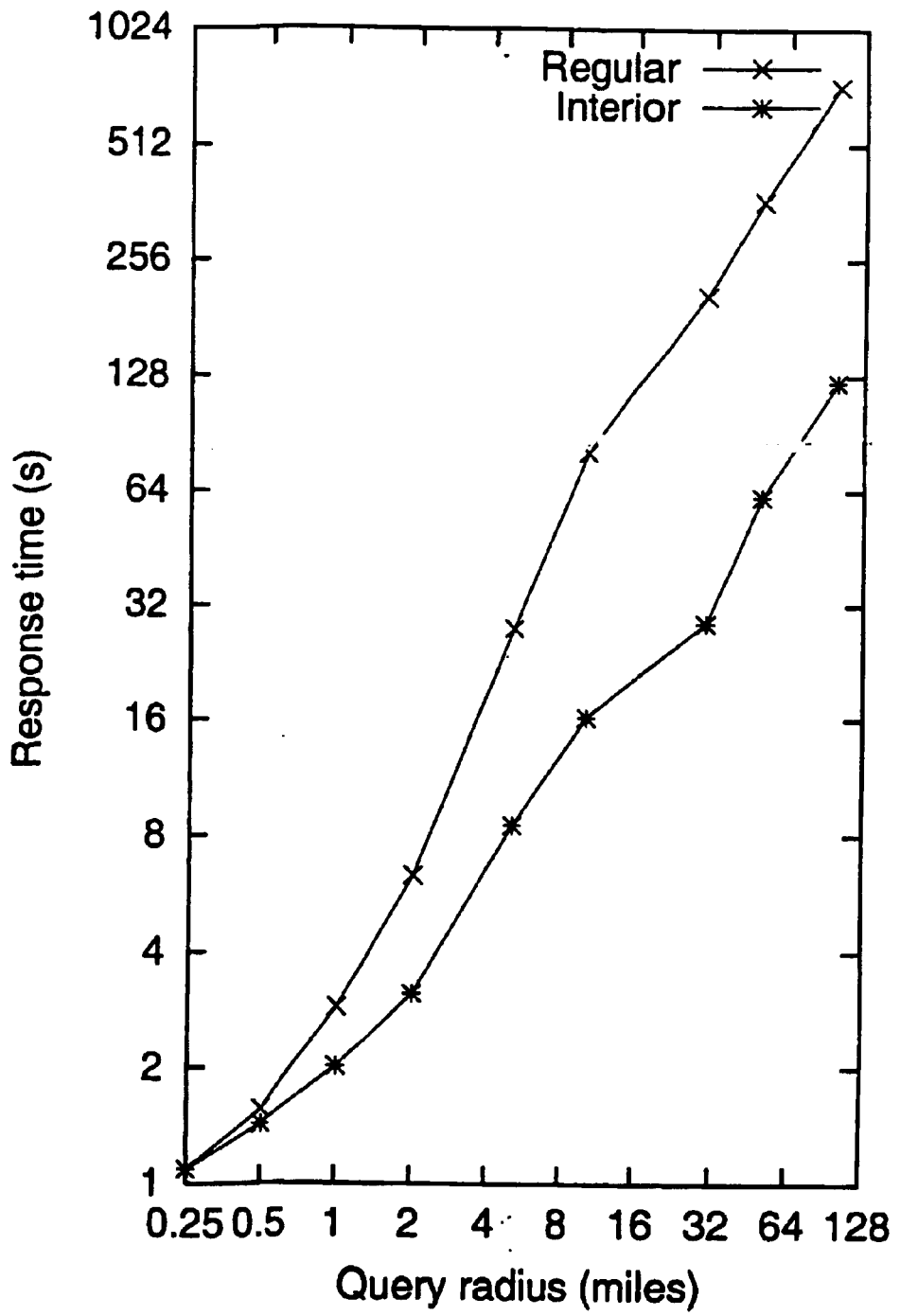

The following describes results for inside-type window queries. The results for the USBG dataset are plotted in FIG. 12(a) and indicate gains similar to those for intersection queries. In these queries, the interior approximations are used to identify candidate geometries that satisfy the query and to include them in result set thereby bypassing the secondary filter. The interior approximations are also useful in eliminating "false hits" for other-type of interactions, such as touch, covers, or coveredby. FIG. 12(b) shows the results for touch queries. The performance gain for 2 mile radius query is around 50% (a factor of 2), and for 10–100 mile radii it is around 84% (a factor of 6). Similar results are also obtained for other masks and for the ABI dataset.

In practice, the present invention has demonstrated significant advantages. According to one example, the present invention was utilized to examine how query performance varies with the tiling level. This example utilized a first dataset that included 230K USBG of polygons, and a second dataset that included 10M ABI dataset of points. The example utilized concave query windows, which included 100 randomly selected counties from the set of ~3200 counties in the United States.

Figure 13A:
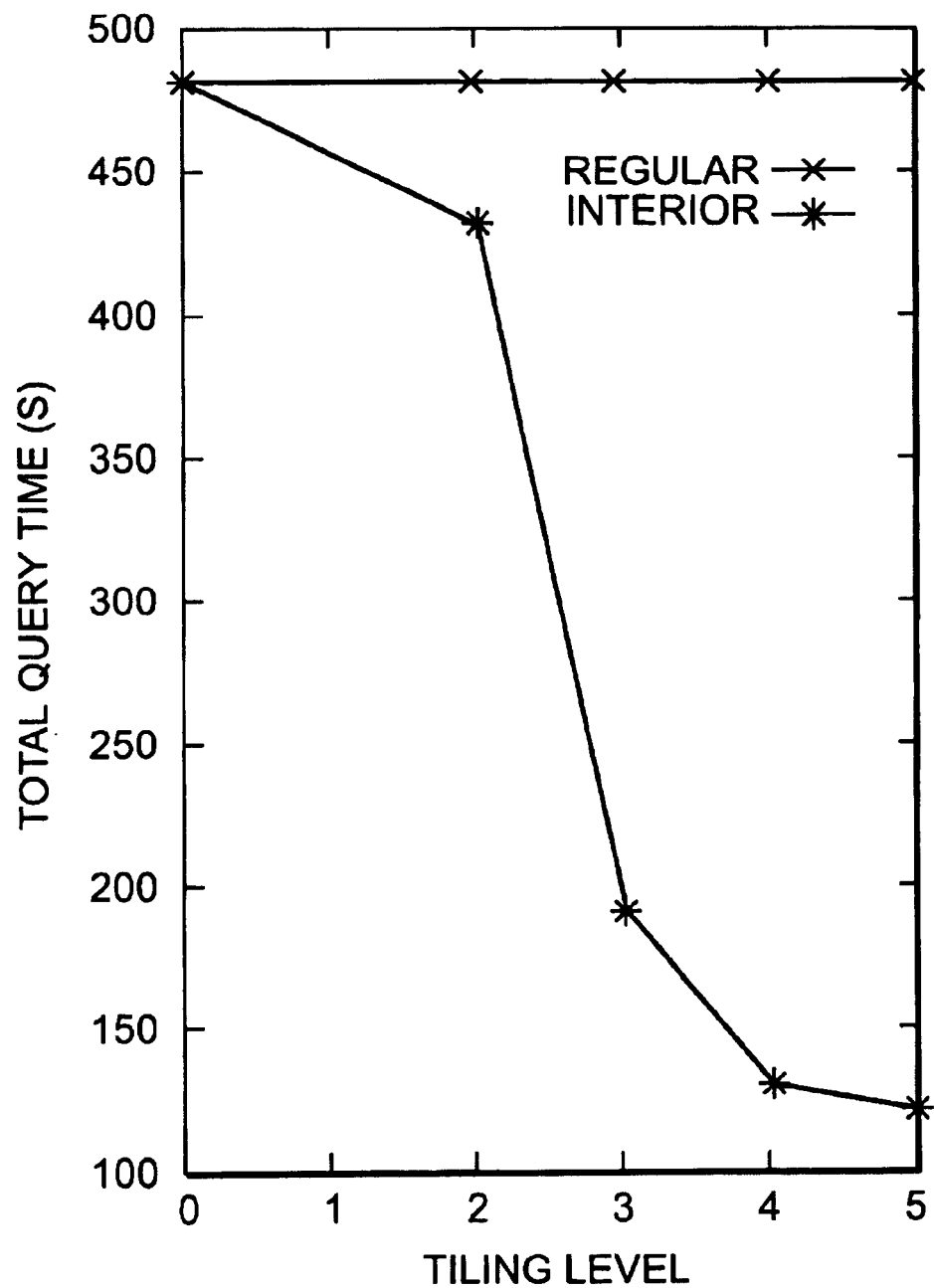
FIGS. 13a, 13b, 14a, and 14b represent graphs that illustrate relationships between total query time ad tiling level.
Figure 13B:
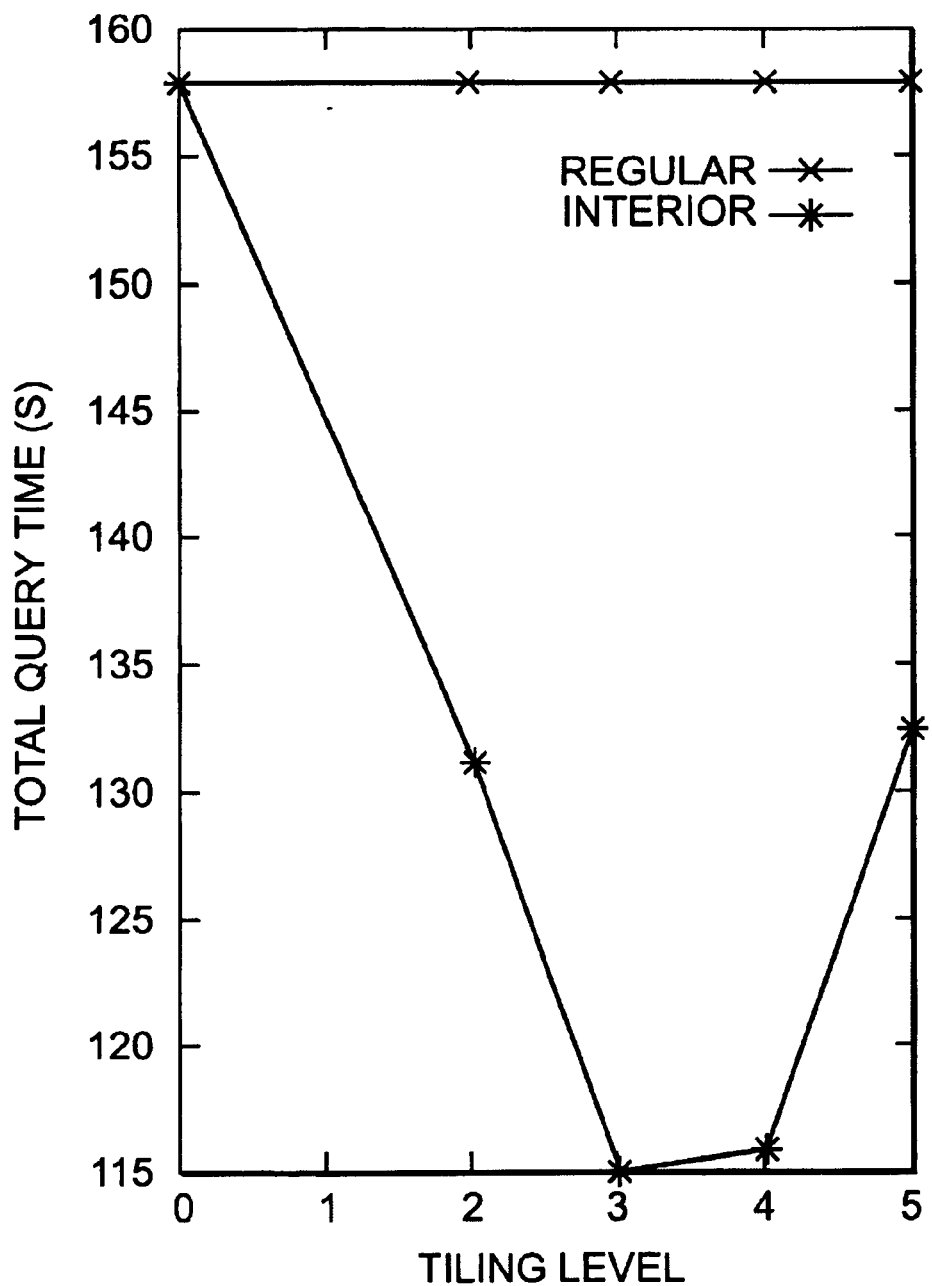

FIGS. 13(a) and 13(b) illustrate the results for different tiling levels. The tiling level is plotted along the x-axis and the query response time along the y-axis. For small tiling levels, such as 2 or 3, the number of interior tiles is also small and, hence, the performance improvements will be negligible. As the tiling level increases from 3 to 4, or 4 to 5 as shown in FIG. 13(a), the number of interior tiles and the tiling time increase and may offset any gains in response time due to acceptance of interior candidates. The example was searching for any interaction.

The next issue that needs to be addressed is how to choose an appropriate tiling level for the query geometry. The amount of interior that is captured increases with the tiling level and contributes directly to reduction in query time. At tiling level 0 or 1, there will not be any interior tiles for any query window since all relevant tiles for the query would intersect the query polygon border. At tiling levels 2, there are at most 4 interior tiles out of a total of 16 tiles. At tiling levels 3, there are at most 36 interior tiles out of a total of 64 tiles, 56% of which are interior. At tiling level 4 there are at most 196 interior tiles out of a total of 256 tiles, 78% of which are interior). In general, assuming the window to be a simple MBR for the best case, at level 1, there will be $4*(2^t-1)$ tiles that form the border (not interior) out of a total of $4^t$ tiles. This indicates that for higher tiling levels, the amount of interior that could be captured will be more and this may lead to higher gains in query performance due to elimination of secondary-filter comparisons. However, as the tiling level increases, the cost of tiling the window to the specified level is an additional overhead to the query time and may offset any gains from the interior-based query gains.

Due to the conflicting effects of increasing or decreasing the tiling level on the number of interiors and the tiling time, tiling levels 3 and 4 achieve good performance for one of the two datasets and perform poorly for the other. This is illustrated in FIGS. 13(a) and 13(b) using USBG and ABI datasets. Tiling level 3 achieves the best performance for USBG data and performs relatively poorly for ABI data. On the other hand, tiling level 5 achieves the best results for ABI data and performs poorly for USBG data. In contrast, tiling level of 4 achieves to nearly the best performance for both the point and polygon datasets. Along these lines, for the USBG dataset, this level of tiling produces about 25% improvement, and for the ABI dataset it results in around 75% improvement in query response time. For the ABI dataset, tiling level 4 generates nearly 75% improvement in performance, as nearly 2000 out of 2500 results are accepted using the interior optimization.

Figure 14A:
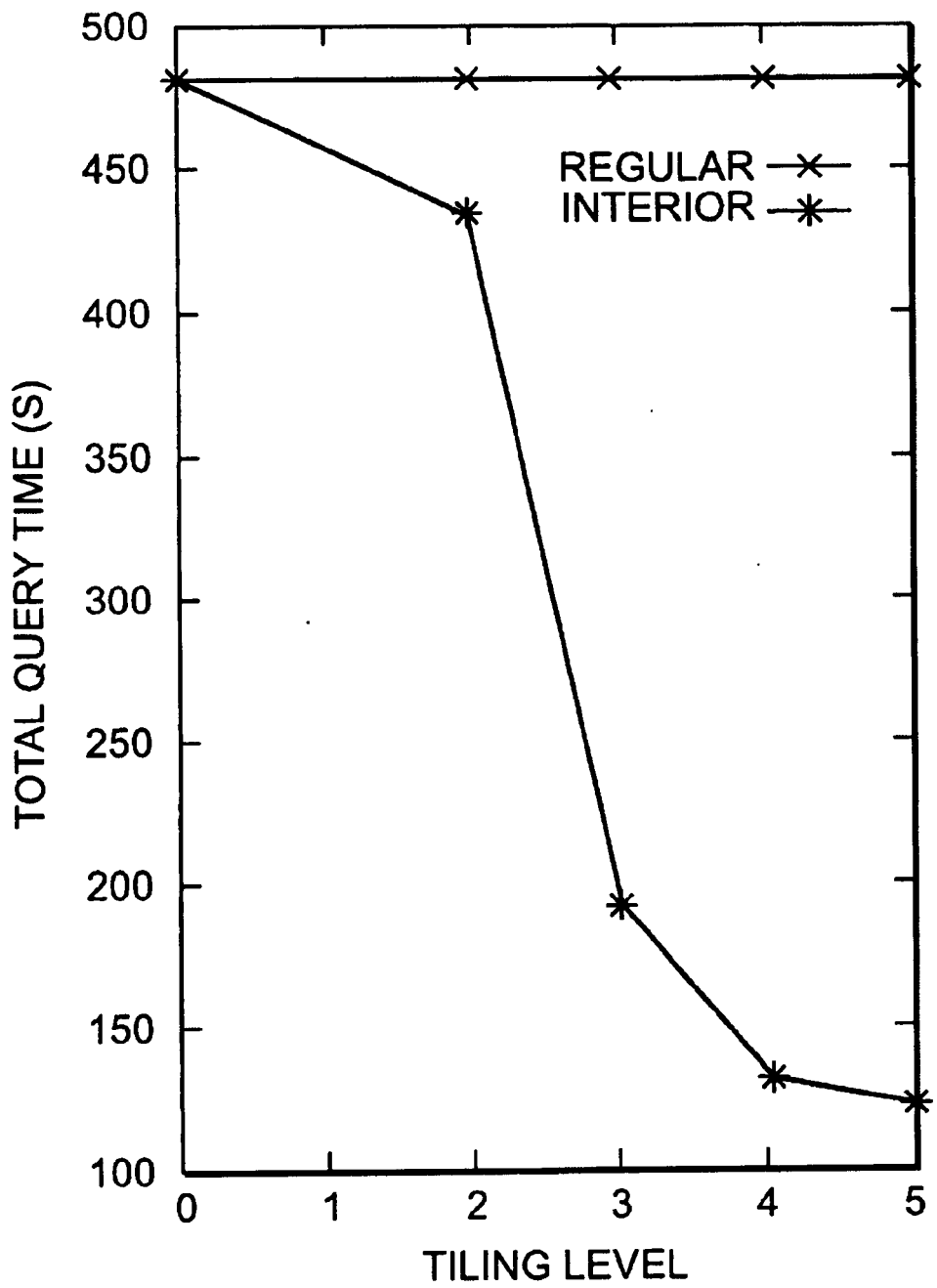
Figure 14B:
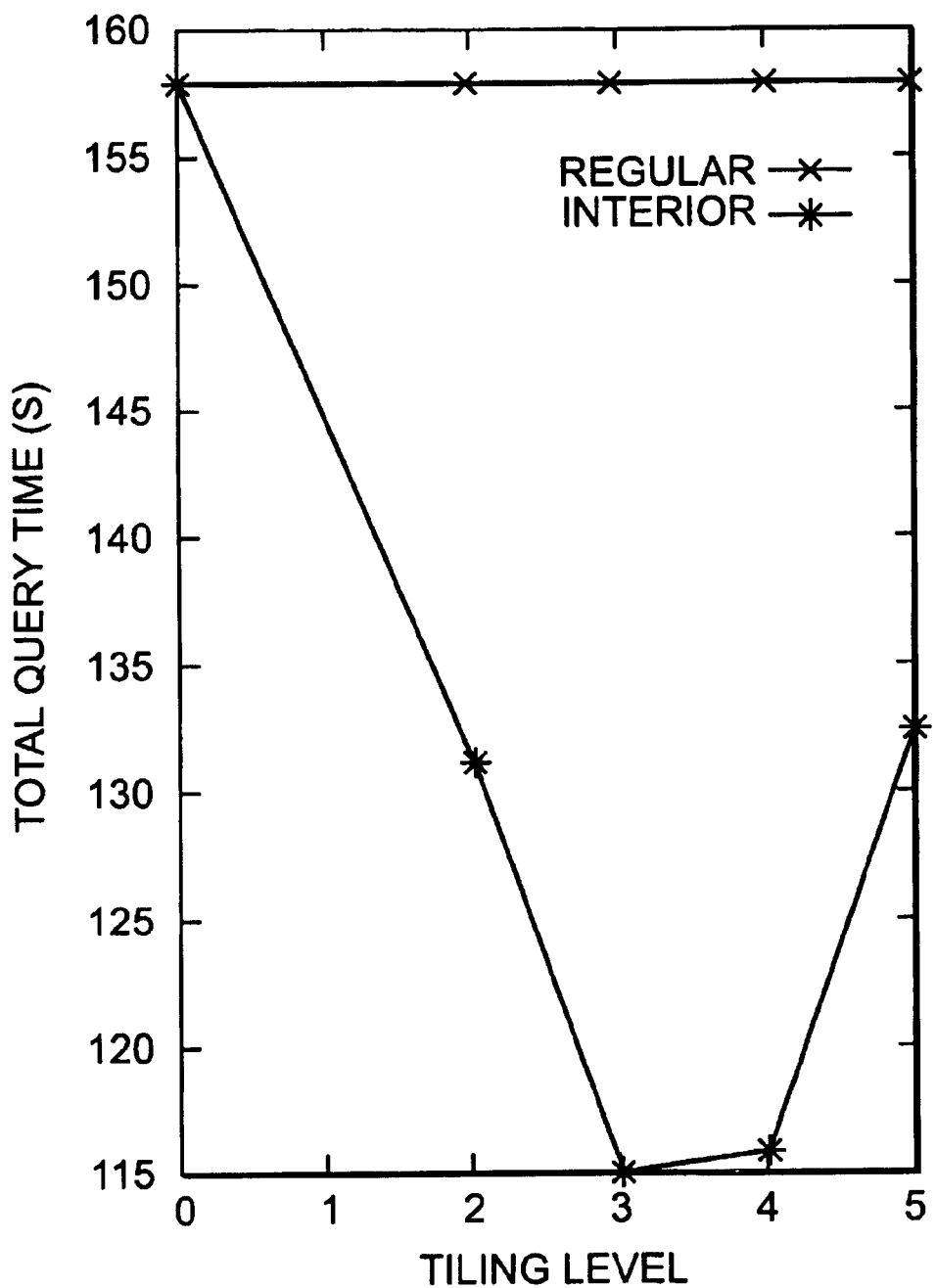

FIGS. 14a and 14b illustrate the results for a "touch"-type of query interaction for the two datasets. The example also demonstrates that tiling levels 4produces a consistently good performance gain of about 30% for the USBG dataset and nearly 75% for the ABI dataset. Similar results are also obtained for other interaction-type queries. From these results, it may be concluded that a tiling level of 4 can achieves good performance gains in many, if not all, cases.

Another example examined improvements produced by the present invention for more rugged query windows, such as state boundaries. Tables 3 and 4 present the improvements from interior approximations when the state of "Maryland" was used as the query window for the USBG dataset and the ABI dataset, respectively. It was observed that the query performance improves by about 25% to about 30% in both cases.

TABLE 3

| Query Interaction | Concave Interior Response Time(s) | Regular Response Time(s) |
|---|---|---|
| Anyinteract | 78 | 92 |
| Inside | 102 | 132 |
| Touch | 530 | 722 |

TABLE 4

| Query Interaction | Concave Interior Response Time(s) | Regular Response Time(s) |
| --- | --- | --- |
| Anyinteract | 450 | 600 |
| Inside | 413 | 612 |
| Touch | 390 | 580 |

The present invention can significantly improve query performance. For convex query windows, query times can be reduced by about 85% for point data and by a factor of about 60% for polygon data. For concave query windows, query times can be reduced by about 75% for point data and by about 30% for polygon data.

Additionally, experiments utilizing the present invention suggest that for some queries the time spent in the secondary filter reduces to less than about 10% of the overall time and to about 16% of the original secondary-filter overhead. These results indicate that the present invention requires little or no structural changes to a commercial database server and produces performance enhancements by utilizing interior approximations. The present invention can also be utilized with other types of queries including nearest-neighbor and to other spatial indexes, such as quadtrees.

The foregoing description of the invention illustrates and describes the present invention. Additionally, the disclosure shows and describes only the preferred embodiments of the invention, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

We claim:

1. A computer implemented method for determining relationships among objects represented in a database, the method comprising the steps of:
   receiving a query including at least a first geometry and a desired relationship between the first geometry and a second geometry;
   providing the query to a primary filter operable to:
      define at least one interior rectangle that lies entirely within the first geometry;
      define a minimum bounding rectangle for the first geometry;
      define a minimum bounding rectangle for the second geometry; and
      compare the minimum bounding rectangle for the first geometry with the minimum bounding rectangle for the second geometry to determine if the second geometry fulfills a primary filter condition comprising an interaction of the first geometry and the second geometry;
   if the second geometry fulfills the primary filter condition, providing the first geometry and the second geometry to an intermediate filter operable to:
      determine whether the second geometry fulfills an intermediate filter condition comprising an interaction of the at least one interior rectangle within the first geometry and the minimum bounding rectangle for the second geometry by analyzing the distribution of the minimum bounding rectangle for the second geometry with respect to the at least one interior rectangle within the first geometry;
   if the second geometry is confirmed as fulfilling the intermediate filter condition, including the second geometry in a final result set of objects that satisfy the desired relationship;
   if the second geometry is confirmed as deviating from the intermediate filter condition, excluding the second geometry from the final result set that satisfy the desired relationship;
   otherwise, providing the first geometry and the second geometry to a secondary filter operable to:
      determine whether the second geometry fulfills a secondary filter condition by comparing the second geometry with the first geometry; and
   if the second geometry fulfills the secondary filter condition, including the second geometry in the final result set of objects that satisfy the desired relationship.

2. A computer program product for performing a process of determining relationships among objects represented in a database, comprising:
   a computer readable medium; and
   computer program instructions, recorded on the computer readable medium, executable by a processor, for performing the steps of:
   receiving a query including at least a first geometry and a desired relationship between the first geometry and a second geometry;
   providing the query to a primary filter operable to:
      define at least one interior rectangle that lies entirely within the first geometry;
      define a minimum bounding rectangle for the first geometry;
      define a minimum bounding rectangle for the second geometry; and
      compare the minimum bounding rectangle for the first geometry with the minimum bounding rectangle for the second geometry to determine if the second geometry fulfills a primary filter condition comprising an interaction of the first geometry and the second geometry;
   if the second geometry fulfills the primary filter condition, providing the first geometry and the second geometry to an intermediate filter operable to:
      determine whether the second geometry fulfills an intermediate filter condition comprising an interaction of the at least one interior rectangle within the first geometry and the minimum bounding rectangle for the second geometry by analyzing the distribution of the minimum bounding rectangle for the second geometry with respect to the at least one interior rectangle within the first geometry;
   if the second geometry is confirmed as fulfilling the intermediate filter condition, including the second geometry in a final result set of objects that satisfy the desired relationship;
   if the second geometry is confirmed as deviating from the intermediate filter condition, excluding the second geometry from the final result set that satisfy the desired relationship;
   otherwise, providing the first geometry and the second geometry to a secondary filter operable to:

determine whether the second geometry fulfills a secondary filter condition by comparing the second geometry with the first geometry; and
if the second geometry fulfills the secondary filter condition, including the second geometry in the final result set of objects that satisfy the desired relationship.

3. A system for performing a process of determining relationships among objects represented in a database, comprising:
a processor operable to execute computer program instructions; and
a memory operable to store computer program instructions executable by the processor, for performing the steps of:
receiving a query including at least a first geometry and a desired relationship between the first geometry and a second geometry;
providing the query to a primary filter operable to:
define at least one interior rectangle that lies entirely within the first geometry;
define a minimum bounding rectangle for the first geometry;
define a minimum bounding rectangle for the second geometry; and
compare the minimum bounding rectangle for the first geometry with the minimum bounding rectangle for the second geometry to determine if the second geometry fulfills a primary filter condition comprising an interaction of the first geometry and the second geometry;
if the second geometry fulfills the primary filter condition, providing the first geometry and the second geometry to an intermediate filter operable to:
determine whether the second geometry fulfills an intermediate filter condition comprising an interaction of the at least one interior rectangle within the first geometry and the minimum bounding rectangle for the second geometry by analyzing the distribution of the minimum bounding rectangle for the second geometry with respect to the at least one interior rectangle within the first geometry;
if the second geometry is confirmed as fulfilling the intermediate filter condition, including the second geometry in a final result set of objects that satisfy the desired relationship;
if the second geometry is confirmed as deviating from the intermediate filter condition, excluding the second geometry from the final result set that satisfy the desired relationship;
otherwise, providing the first geometry and the second geometry to a secondary filter operable to:
determine whether the second geometry fulfills a secondary filter condition by comparing the second geometry with the first geometry; and
if the second geometry fulfills the secondary filter condition, including the second geometry in the final result set of objects that satisfy the desired relationship.

4. A computer implemented method for determining relationships among objects represented in a database, the method comprising the steps of:
receiving a query including at least a first geometry and a desired relationship between the first geometry and a second geometry;
providing the query to a primary filter operable to;
define at least one interior geometric shape that lies entirely within the first geometry;
define an approximation of the first geometry;
define an approximation of the second geometry; and
compare the approximation of the first geometry with the approximation of the second geometry to determine if the second geometry fulfills a primary filter condition comprising an interaction of the first geometry and the second geometry;
if the second geometry fulfills the primary filter condition, providing the first geometry and the second geometry to an intermediate filter operable to:
determine whether the second geometry fulfills an intermediate filter condition comprising an interaction of the first geometry and the second geometry by analyzing the distribution of the approximation of the second geometry with respect to the at least one interior geometric shape within the first geometry;
if the second geometry is confirmed as fulfilling the intermediate filter condition, including the second geometry in a final result set of objects that satisfy the desired relationship;
if the second geometry is confirmed as deviating from the intermediate filter condition, excluding the second geometry from the final result set that satisfy the desired relationship;
otherwise, providing the first geometry and the second geometry to a secondary filter operable to:
determine whether the second geometry fulfills a secondary filter condition by comparing the second geometry with the first geometry; and
if the second geometry fulfills the secondary filter condition, including the second geometry in the final result set of objects that satisfy the desired relationship.

5. A system for performing a process of determining relationships among objects represented in a database, comprising:
a processor operable to execute computer program instructions; and
a memory operable to store computer program instructions executable by the processor, for performing the steps of:
receiving a query including at least a desired relationship between a first geometry and a second geometry; and
providing the first geometry and the second geometry to a filter; and the filter operable to:
determine whether the second geometry fulfills a filter condition comprising an interaction of at least one interior rectangle defined for the first geometry that lies entirely within the first geometry and a minimum bounding rectangle defined for the second geometry by analyzing the distribution of the minimum bounding rectangle for the second geometry with respect to the at least one interior rectangle within the first geometry;
include the second geometry in a final result set of objects that satisfy the desired relationship if the second geometry is confirmed as fulfilling the filter condition;
exclude the second geometry from the final result set the satisfy the desired relationship if the second geometry is confirmed as deviating from the filter condition; and
provide the first geometry and the second geometry to a secondary filter if the second geometry cannot be confirmed as fulfilling, or deviating from, the filter condition.

6. A computer program product for performing a process of determining relationships among objects represented in a database, comprising:
 a computer readable medium; and
 computer program instructions, recorded on the computer readable medium, executable by a processor, for performing the steps of:
 receiving a query including at least a desired relationship between a first geometry and a second geometry; and
 providing the first geometry and the second geometry to a filter; and the filter operable to:
  determine whether the second geometry fulfills a filter condition comprising an interaction of at least one interior rectangle defined for the first geometry that lies entirely within the first geometry and a minimum bounding rectangle defined for the second geometry by analyzing the distribution of the minimum bounding rectangle for the second geometry with respect to the at least one interior rectangle within the first geometry;
  include the second geometry in a final result set of objects that satisfy the desired relationship if the second geometry is confirmed as fulfilling the filter condition;
  exclude the second geometry from the final result set the satisfy the desired relationship if the second geometry is confirmed as deviating from the filter condition; and
  provide the first geometry and the second geometry to a secondary filter if the second geometry cannot be confirmed as fulfilling, or deviating from, the filter condition.

7. A computer implemented method for determining relationships among objects represented in a database, the method comprising the steps of:
 receiving a query including at least a desired relationship between a first geometry and a second geometry; and
 providing the first geometry and the second geometry to a filter operable to:
  determine whether the second geometry fulfills a filter condition comprising an interaction of at least one interior rectangle defined for the first geometry that lies entirely within the first geometry and a minimum bounding rectangle defined for the second geometry by analyzing the distribution of the minimum bounding rectangle for the second geometry with respect to the at least one interior rectangle within the first geometry; and
  if the second geometry is confirmed as fulfilling the filter condition, including the second geometry in a final result set of objects that satisfy the desired relationship;
  if the second geometry is confirmed as deviating from the filter condition, excluding the second geometry from the final result set that satisfy the desired relationship;
  otherwise, providing the first geometry and the second geometry to a secondary filter.

8. The method according to claim 7, wherein the first geometry and the second geometry comprise data geometries stored in a database.

9. The method according to claim 7, wherein the first geometry comprises a data geometry stored in a database and the second geometry comprises a query geometry.

10. The method according to claim 9, wherein determining whether the first geometry and the second geometry fulfill the secondary filter condition comprises mathematically comparing the fist geometry and the second geometry.

11. The method according to claim 9, wherein the secondary filter condition is fulfilled if the first geometry and the second geometry overlap.

12. The method according to claim 9, wherein the secondary filter condition is fulfilled if a boundary of the first geometry touches a boundary of the second geometry.

13. The method according to claim 9, wherein the secondary filter condition is fulfilled if the first geometry and the second geometry intersect.

14. A method according to claim 9, further comprising providing the first geometry and the second geometry to a secondary filter operable to:
 determine whether the second geometry fulfills a secondary filter condition by comparing the second geometry with the first geometry; and
 if the second geometry fulfills the secondary filter condition, including the second geometry in the final result set of objects that satisfy the desired relationship, otherwise excluding the second geometry from the final result set of objects that satisfy the desired relationship.

15. The method according to claim 7, wherein the first geometry is larger than the second geometry.

16. The method according to claim 7, wherein minimum bounding rectangles are defined for a plurality of second geometries.

17. The method according to claim 7, wherein the first geometry is a collection of geometries each including a separate interior.

18. The method according to claim 7, wherein providing the first geometry and the second geometry to the filter is in response to the second geometry fulfilling a primary filter condition comprising any intersection between the minimum bounding rectangle for the first geometry and a minimum bounding rectangle defined for the second geometry.

19. The method according to claim 7, wherein the at least one interior rectangle that lies entirely within the first geometry is defined by dividing the dividing the minimum bounding rectangle for the first geometry into a plurality of pieces and defining a largest possible interior rectangle lying completely within the first geometry and the plurality of pieces.

20. The method according to claim 19, wherein the plurality of pieces are rectangles.

21. The method according to claim 20, wherein the plurality of pieces are five rectangles having similar sizes.

22. The method according to claim 20, wherein the minimum bounding rectangle for the first geometry is divided into four rectangles having similar sizes.

23. The method according to claim 7, wherein a minimum bounding rectangle defined for the second geometry comprises a smallest rectangle that at most intersects a boundary of the second geometry.

24. The method according to claim 7, wherein the filter condition is fulfilled if a minimum bounding rectangle defined for the second geometry lies entirely within the minimum bounding rectangle of the first geometry.

25. The method according to claim 7, wherein the primary filter condition is one of:
 a minimum bounding rectangle defined for the second geometry lying entirely within the minimum bounding rectangle of the first geometry;
 the minimum bounding rectangle of the second geometry intersecting the minimum bounding rectangle of the first geometry;
 a border of the minimum bounding rectangle of the second geometry touching a border of the minimum bounding rectangle of the first geometry;

the minimum bounding rectangle of the first geometry lying entirely within the minimum bounding rectangle of the second geometry; and the minimum bounding rectangle of the second geometry is disjoint from the minimum bounding rectangle of the first geometry.

26. The method according to claim 7, wherein the first geometry is divided into five interior rectangles.

27. The method according to claim 7, wherein one of the first geometry and the second geometry comprise objects in a database.

28. The method according to claim 27, wherein the objects in the database comprises locations in a geographic region.

29. The method according to claim 27, wherein the database is organized in an R-tree hierarchy.

30. The method according to claim 27, wherein the database comprises a spatial database.

31. The method according to claim 27, wherein the first geometry and the second geometry comprise objects on a surface.

32. The method according to claim 31, wherein the database stores exact geometries and approximations of geometries.

33. The method according to claim 7, wherein at least one of the first geometry and the second geometry is convex.

34. The method according to claim 33, wherein at least one of the first geometry and the second geometry comprises a plurality of separate interiors.

35. The method according to claim 7, wherein at least one of the first geometry and the second geometry is concave.

36. A computer implemented method for determining relationships among objects represented in a database, the method comprising the steps of:

receiving a query including at least a desired relationship between a first geometry and a second geometry;

providing the first geometry and the second geometry to a filter operable to:

determine whether the second geometry fulfills a filter condition comprising an interaction of at least one interior rectangle defined for the first geometry that lies entirely within the first geometry and a minimum bounding rectangle defined for the second geometry by analyzing the distribution of the minimum bounding rectangle for the second geometry with respect to the at least one interior rectangle within the first geometry; and if the second geometry is confirmed as fulfilling the filter condition, including the second geometry in a final result set of objects that satisfy the desired relationship;

if the second geometry is confirmed as deviating from the filter condition, excluding the second geometry from the final result set that satisfy the desired relationship;

otherwise, providing the first geometry and the second geometry to a secondary filter.

37. The method according to claim 36, further comprising providing the query to a primary filter operable to:

define at least one interior rectangle that lies entirely within the first geometry;

define a minimum bounding rectangle for the first geometry; and define a minimum bounding rectangle for the second geometry.

38. The method according to claim 37, wherein the primary filter is operable to compare the minimum bounding rectangle for the first geometry with the minimum bounding rectangle for the second geometry to determine if the second geometry fulfills a primary filter condition comprising an interaction of the first geometry and the second geometry.

39. A method according to claim 38, wherein the secondary filter is operable to:

determine whether the second geometry fulfills a secondary filter condition by comparing the second geometry with the first geometry; and if the second geometry fulfills the secondary filter condition, including the second geometry in the final result set of objects that satisfy the desired relationship, otherwise excluding the second geometry from the final result set of objects that satisfy the desired relationship.

40. The method according to claim 36, wherein at least one of the first geometry and the second geometry is convex.

41. The method according to claim 40, wherein at least one of the first geometry and the second geometry comprises a plurality of separate interiors.

42. The method according to claim 36, wherein at least one of the first geometry and the second geometry is concave.

43. The method according to claim 42, wherein concave geometries are approximated utilizing convex pieces.

44. The method according to claim 42, wherein concave geometries are approximated utilizing tiles.

45. The method according to claim 44, wherein a minimum bounding rectangle is tiled and tiles interior to the geometry are identified.

46. The method according to claim 44, wherein the tiling level is 5.

47. The method according to claim 44, wherein the tiling level is 4.

48. The method according to claim 44, wherein the tiling level is 3.

49. The method according to claim 44, further comprising determining whether a primary filter condition is fulfilled by comparing interior tiles.

50. The method according to claim 42, wherein the approximation of the first geometry comprises a minimum bounding rectangle and an approximation defined for the second geometry comprises a minimum bounding rectangle and wherein comparing the interior tiles comprises:

dividing the second geometry minimum bounding rectangle into tiles;

assigning X and Y values to the tiles;

determining which tiles lie interior to the second geometry;

determining X and Y location of each tile;

storing the interior tiles in an array ordered first by X location;

storing the interior tiles in an array ordered first by Y location; and comparing at least one of the tiles or the minimum bounding rectangle of the first geometry with the interior tiles of the second geometry to determine the relationships among the geometries.

51. The method according to claim 50, wherein comparing the minimum bounding rectangle of the first geometry with the interior tiles of the second geometry comprises determining whether each side of the minimum bounding rectangle of first geometry is inside the interior tiles of the second geometry which comprises:

determining X and Y locations within the tiles of corners of the minimum bounding rectangle of the first geometry;

determining X and Y locations within the tiles of second geometry for two corners of each side of the first geometry; and determining whether all tiles between the two corners of each side of the first geometry are interior to the second geometry by comparing a difference in an x-location or a y-locations of the two corners to the number of interior tiles between these two corners.

52. The method according to claim 51, wherein whether the x-location or the y-location is compared depends upon whether the side is parallel to y-axis or x-axis.

53. The method according to claim 51, wherein the second geometry is not a simple polygon.

54. The method according to claim 51, wherein the second geometry is a compound geometry comprising multiple polygons or a geometry comprising holes, and wherein determining if the minimum bounding rectangle of the first geometry is interior to the interior tiles of second geometry by comparing the interior of the minimum bounding rectangle of first geometry to the interior tiles of second geometry.

55. The method according to claim 50, wherein comparing the minimum bounding rectangle of the first geometry with the interior tiles of the second geometry comprises determining whether each side of the minimum bounding rectangle of first geometry is inside the interior tiles of the second geometry which comprises:

determining X and Y locations within the tiles of corners of the minimum bounding rectangle of the first geometry;

determining X and Y locations within the tiles of second geometry for two corners of line interior to the MBR of the first geometry; and determining whether all tiles between the two corners any line interior to the MBR of the first geometry are interior to the second geometry by comparing a difference in an x-location or a y-locations of the two corners to the number of interior tiles between these two corners.

* * * * *